(12) United States Patent
Han et al.

(10) Patent No.: US 10,872,305 B2
(45) Date of Patent: *Dec. 22, 2020

(54) DEPOT DISPATCH PROTOCOL FOR AGGREGATING ON-DEMAND DELIVERIES

(71) Applicant: DoorDash, Inc., San Francisco, CA (US)

(72) Inventors: Jeff Ning Han, Palo Alto, CA (US); Dan Michael Babcock, Fairfield, CA (US); Thomas Scott Stephens, New York, NY (US); Cody Duane Aughney, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 15/798,219

(22) Filed: Oct. 30, 2017

(65) Prior Publication Data

US 2019/0130354 A1     May 2, 2019

(51) Int. Cl.
*G06Q 10/08* (2012.01)
*G06Q 30/06* (2012.01)

(52) U.S. Cl.
CPC ... *G06Q 10/08355* (2013.01); *G06Q 10/0832* (2013.01); *G06Q 10/0833* (2013.01); *G06Q 30/0633* (2013.01)

(58) Field of Classification Search
CPC ......... G06Q 10/08355; G06Q 10/0832; G06Q 10/0833; G06Q 30/0633
See application file for complete search history.

(56) References Cited

U.S. PATENT DOCUMENTS

| | | | | |
|---|---|---|---|---|
| 10,043,149 | B1* | 8/2018 | Iacono | G06Q 30/0637 |
| 2002/0152128 | A1* | 10/2002 | Walch | G06Q 10/08 705/26.2 |
| 2014/0188750 | A1* | 7/2014 | Seiler | G06Q 10/08345 705/335 |
| 2014/0278686 | A1* | 9/2014 | Mullings | G06Q 10/1097 705/7.21 |
| 2015/0227888 | A1* | 8/2015 | Levanon | G06Q 10/0834 705/334 |

(Continued)

OTHER PUBLICATIONS

Hetal Bhavsar, "A Comparative Study of Training Algorithms for Supervised Machine Learning", 2012, p. 74-76 (Year: 2012).*

(Continued)

*Primary Examiner* — George Chen
*Assistant Examiner* — Ibrahim N El-Bathy

(57) ABSTRACT

Provided are various mechanisms and processes for optimizing real-time, on-demand deliveries of perishable goods. In one aspect, a method is provided for aggregating on-demand deliveries using a depot dispatch protocol. The method comprises dispatching runners to pick up on-demand orders for drop off at a depot where the orders are aggregated and batched based on optimized delivery routes and destination proximities. Batches of orders are then assigned to couriers who may arrive at the depot to receive the batched orders without having to navigate through areas of high congestion. Such delivery routing system may be implemented alongside a delivery tracking system for generating estimated time of arrival predictive updates for real-time delivery of perishable goods.

20 Claims, 13 Drawing Sheets

(56) References Cited

U.S. PATENT DOCUMENTS

2015/0235170 A1* 8/2015 Mallers .............. G06Q 10/0832
705/332
2016/0350837 A1* 12/2016 Williams ........... G06Q 30/0633
2019/0188818 A1* 6/2019 Luo ....................... H04W 4/029

OTHER PUBLICATIONS

"Technological Disruption and Innovation in Last-Mile Delivery," gsb.stanford.edu/r/vcii, Jun. 2016, 26 pages.
"Synchronized Last-Mile Logistics for Sustainable, Efficient Urban Delivery," vol. 13-Nov, CUL gsb.stanford.edu/r/vcii, Jun. 2016, 26 pages.

* cited by examiner

DEPOT DISPATCH PROTOCOL FOR AGGREGATING ON-DEMAND DELIVERIES

TECHNICAL FIELD

The present disclosure relates to a logistics platform system for facilitating a real-time, on-demand deliveries of perishable goods. In one example, the present disclosure relates to mechanisms and processes for optimizing such deliveries using aggregating depots.

BACKGROUND

Logistics platforms, particularly logistics platforms for managing real-time on-demand deliveries of perishable goods, rely on accurate location, status, and routing mechanisms to effectively and efficiently connect consumers with providers. However, systems may be inefficient or delayed when the various goods originate from providers located in different locations including high congestion commercial areas.

Consequently, it is desirable to provide improved mechanisms for optimizing delivery routes and the handling of orders, particularly with respect to logistics platforms for managing real-time on-demand deliveries of perishable goods.

SUMMARY

Provided are various mechanisms and processes for optimizing real-time, on-demand deliveries of perishable goods. In one aspect, which may include at least a portion of the subject matter of any of the preceding and/or following examples and aspects, a technique is provided for aggregating on-demand deliveries using a depot dispatch protocol. The technique includes receiving a first order at a server from a first customer for real-time delivery of perishable goods from a first restaurant.

Multiple estimated time of arrivals (ETAs) are dynamically generated for a plurality of events for the first order based on a plurality of weighted factors including historical restaurant data. The plurality of events for the first order may include: receipt of the first order, confirmation of receipt of the first order, confirmation of completion of the first order, receipt of the first order at an aggregation depot, and receipt of the first order by the first customer.

The method further comprises receiving a timestamp corresponding to the confirmation of receipt of the first order from the first restaurant. A runner is then scheduled to arrive at the first restaurant upon completion of the first order by the first restaurant. The runner delivers the first order from the first restaurant to an aggregation depot, and receipt of the first order from the runner at the aggregation depot is confirmed.

The method further comprises batching a plurality of orders including the first order for pickup at the aggregation depot by a courier. The plurality of orders may be batched based upon delivery proximity to the first customer. The courier is then authenticated at the aggregation depot, and scheduled to deliver the first order to the first customer.

The method may further comprise receiving a second order at the server for real-time delivery of perishable goods from a second restaurant, and dynamically generating a plurality of ETAs for a plurality of events for the second order based on a plurality of weighted factors including historical restaurant data. The plurality of events for the second order may include: receipt of the second order, confirmation of receipt of the second order, confirmation of completion of the second order, and receipt of the second order at an aggregation depot.

The method may further comprise receiving a timestamp corresponding to the confirmation of receipt of the second order from the second restaurant, grouping the first order and the second order into a first group of orders based upon the ETA for the confirmation of order completion for the first order and the ETA for the confirmation of order completion for the second order. The runner is scheduled to arrive at the second restaurant upon completion of the second order by the second restaurant, and delivers the second order from the second restaurant to the aggregation depot.

The first order and the second order may be grouped into the first group of orders based upon the proximity of the first restaurant to the second restaurant. The first order and the second order may be grouped into the first group of orders are based upon a generated route assigned to the runner. The first order and the second order may be batched for pickup at the aggregation depot by the courier.

In various embodiments, the plurality of ETA time durations may be dynamically generated using a neural network located on a processor configured to operate in a training mode and an inference mode.

In the training mode, the processor is configured to pass a dataset into the neural network. The dataset includes a series of successive events with corresponding known time durations between events. In the training mode, the processor is further configured to train the neural network to accurately and dynamically output ETA predictive updates. Training the neural network may include inputting different combinations of events and time durations, and comparing actual time of arrivals (ATAs) with generated ETA predictions to allow for the neural network to automatically and iteratively adjust weighted factors in the neural network.

In the inference mode, the processor is configured to pass a first event of the plurality of events including a first timestamp into the neural network, automatically generate a first ETA prediction based on trained weighted factors, pass a second event of the plurality of events including an updated timestamp into the neural network, and automatically adjust the first ETA prediction to form a second updated ETA prediction.

The plurality of weighted factors may include data on the dishes in the order by the customer. The plurality of weighted factors may include time, date, and weather. The plurality of weighted factors may include a sub-total of the order and the number of orders at the restaurant. Various events in the plurality of events may be received from one or more of the following: the courier, the restaurant, and the customer.

Other implementations of this disclosure include corresponding devices, systems, and computer programs for aggregating on-demand deliveries. These other implementations may each optionally include one or more of the following features. For instance, provided is a server system comprising one or more processors, memory, and one or more programs stored in the memory. The one or more programs comprise instructions for implementing the described methods. The one or more programs may further comprise instructions for dynamically generating the plurality of ETA time durations using a neural network on the one or more processors by operating in a training mode and an inference mode.

Also provided is a programmable device configured for aggregating on-demand deliveries. According to various embodiments, the programmable device is configured to receiving a plurality of orders at a server from one or more customers for real-time delivery of perishable goods from one or more restaurants, and dynamically generating a plurality of estimated time of arrivals (ETAs) for a plurality of events for each order based on a plurality of weighted factors including historical restaurant data. The plurality of events for each order include: order receipt, confirmation of order receipt, and confirmation of order completion.

The programmable device is further configured to group one or more orders of the plurality of orders into a first group of orders based upon the ETAs for the confirmation of order completion for each order, and schedule a runner to arrive at one or more restaurants corresponding to the first group of orders upon order completion of the one or more orders in the first group. The runner then delivers the first group of orders to an aggregation depot.

The programmable device is further configured to confirm receipt of the first group of orders from the runner at the aggregation depot, and batch the one or more orders of the first group into a second group of orders for pickup at the aggregation depot by a courier. The second group of orders may be batched based upon delivery proximity to one or more corresponding customers. The programmable device is further configured to authenticate the courier at the aggregation depot. The courier is scheduled to deliver the second group of orders to corresponding customers.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
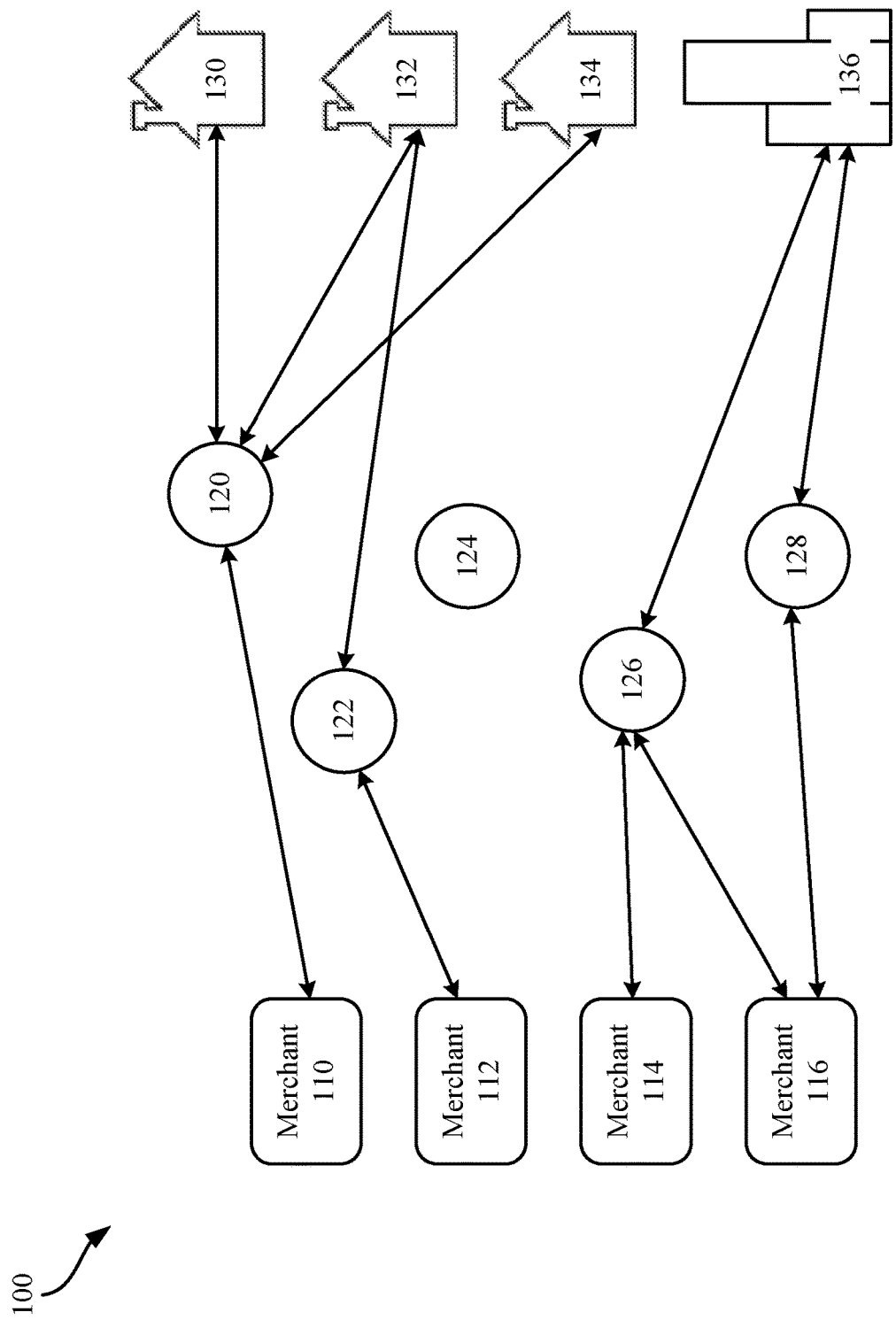
FIG. 1 illustrates one example of a delivery logistics system having multiple merchants, couriers, and customers, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention will be described in the context of particular protocols, such as Wi-Fi or Bluetooth. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, logistics platforms managing real-time on-demand deliveries of perishable goods rely on accurate location, status, and routing mechanisms to allow for effective and efficient delivery experiences between providers and customers. In particular, providers located in a variety of disparate locations, particular highly congested disparate locations, can make it difficult for couriers and delivery people to easily pick up perishable goods from these locations. These may be restaurants located in high traffic areas with limited parking. As used herein, the term "provider" may be used to describe various types of merchants that provide goods, including perishable goods, and the terms "provider" and "merchant" may be used interchangeably. As used herein, the term "delivery associate" may be used to describe a driver or courier that is delivers the goods provided by the merchant to a customer, and the terms "delivery associate" and "courier" may be used interchangeably.

Overview

In current systems, a group of merchants may be located in regions with high dispatch concentration and/or high congestion due to high foot and vehicle traffic or lack of parking. For example, couriers may require additional time to navigate through and look for parking in downtown areas, where demand for orders is high.

According to various embodiments, a depot dispatch protocol may be implemented wherein orders from merchants within a given area are picked up by runners and dropped off at an aggregation depot. The merchants in the given area may be located within a short distance from the aggregation depot. Each merchant may be assigned a designated runner such that each merchant has at least one runner. However, a runner may be assigned to multiple merchants. Runners may be assigned to pick up groups of orders based on their estimated time of completion by the merchant. Runners may travel to and from merchant locations on foot, or by bicycle, scooter, or other vehicle that can more efficiently navigate the busy area.

Because runners do not have to navigate through traffic or find parking, orders for perishable goods may be efficiently transferred from the merchant locations to a central distribution hub. A dispatcher may oversee the aggregated orders and assign the orders to couriers. In some embodiments, the orders may be batched into groups for delivery based on destination proximity or generated delivery routes. In some embodiments, an automated order retrieval system may be implemented in lieu of a dispatcher. An agent configured to transfer on-demand perishable good orders from a merchant location to a depot is referred to herein as a runner. According to various embodiments, the runner may be a person, an automated drone. In some examples, the runner is an autonomous drone that is routed to various providers based on expected orders. The provider places the perishable goods order or orders into or onto the drone and the drone proceeds to the next provider or to the depot.

The couriers may then navigate to the aggregation depot to pick up the assigned orders for delivery to customers. Because the orders are collected and ready for pickup at a single location, couriers do not have to travel through congested areas to pick up orders from merchants, and courier time and activity is streamlined. Additionally, the couriers are never at risk of waiting for an order to become ready at the merchant. These systems further optimize deliveries by streamlining order batching reducing the amount of travel and parking required for additional orders. The described protocol requires little to no coordination between couriers, dispatchers, and runners.

The disclosed systems can be used whenever there exists a need to efficiently dispatch deliveries from merchants to third-party delivery fulfillment services. The systems may work especially well when a high volume of deliveries being produced in a specific region can be expected, and are flexible and lightweight enough to set up for special events, road closures, and other situations that would make normal vehicular transport more difficult.

Example Embodiments

With reference to FIG. 1, shown is an example of a delivery logistics system 100 implemented for multiple merchants, couriers, and customers, in accordance with one or more embodiments. In the present example, the delivery logistics system 100 is managed by a logistics platform for real-time, on-demand, delivery of perishable goods. For instance, a customer may order food from a restaurant by using a mobile device application that places the order through the delivery logistics platform. In some instances, the user may also access the delivery logistics platform through the internet via a computer, laptop, tablet, etc. When the customer orders the food through the delivery logistics platform, the order is prepared at a provider site, where a delivery associate will then pick up the order and delivery the order from the provider site to the customer.

As shown in FIG. 1, system 100 includes providers 100, 112, 114, and 116. According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and delivery logistics platform in the context of restaurants and food delivery, the mechanisms and processes described herein may also be applied to the delivery of various other perishable items. As used herein, the terms "provider" and "merchant" may be used interchangeably.

System 100 also includes one or more couriers 120, 122, 124, 126, and 128. Such couriers may be on foot, or traveling by vehicle, such as a car, scooter, bicycle, etc. In various embodiments of system 100, one or more couriers may be directed to one or more merchants to receive an order placed by customers and deliver the orders to the customers located at corresponding destinations 130, 132, 134, or 136, which may be residential or commercial addresses. In some embodiments, the destinations may correspond to a particular geo-location determined by GPS or other coordinate system.

In various embodiments, the logistics platform may determine the estimated time arrival (ETA) of delivery of the order to the customer once the order has been placed. This ETA may be provided to the customer. The ETA of delivery of an order may be estimated based on tracked events or milestones corresponding to the order. As used herein, the terms "events" may be used interchangeably with "milestones." The customer may also be provided with information regarding the status of the order, events, or milestones. The customer may also be provided with other information, such as information corresponding to the courier, etc. Information regarding the status of the order, events, or milestones may also be provided to the merchants and the couriers.

Figure 2:
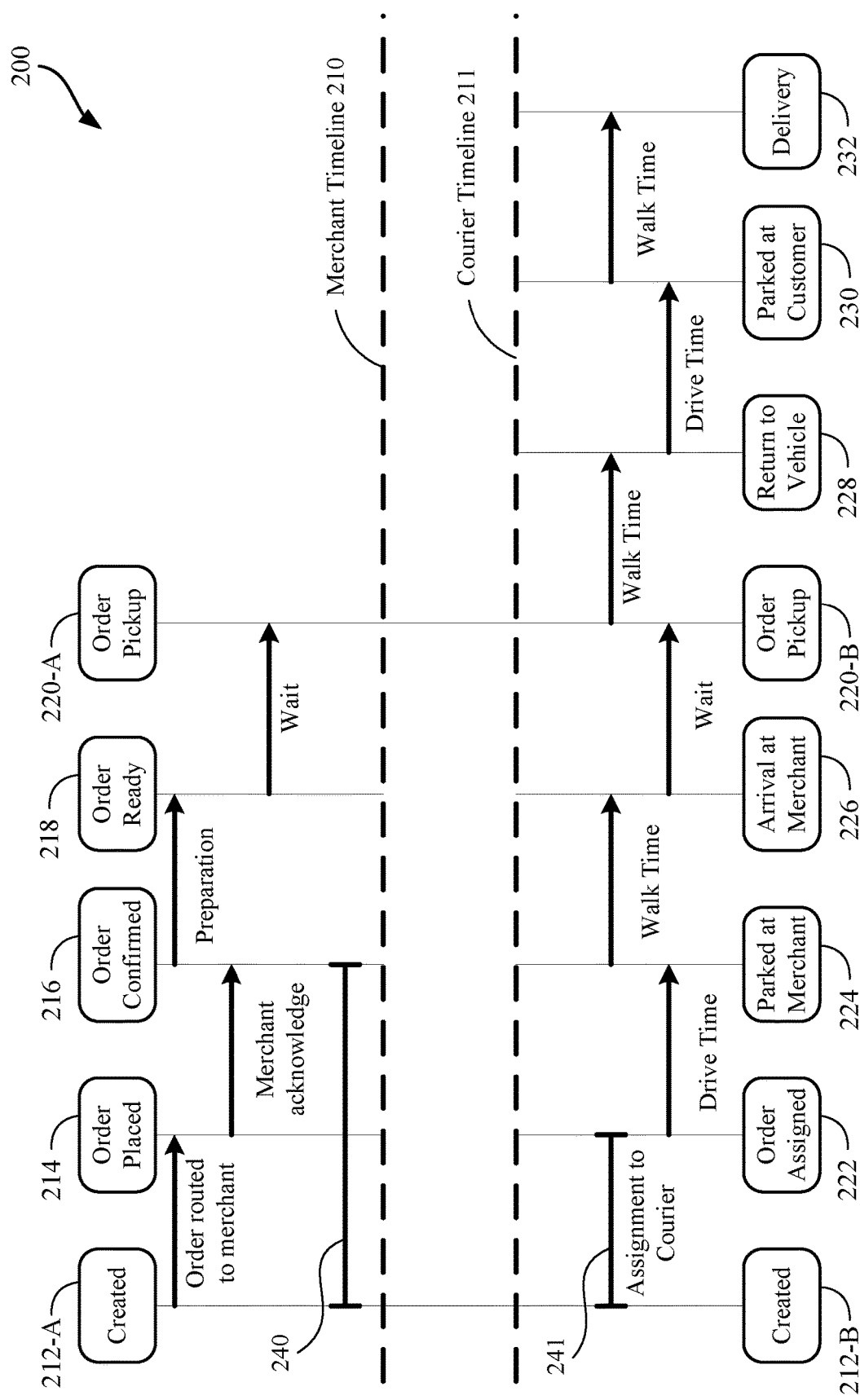
FIG. 2 illustrates an example timeline of delivery events associated with real-time on-demand delivery of perishable goods, in accordance with one or more embodiments.

With reference to FIG. 2, shown is an example timeline 200 of delivery events associated with real-time on-demand delivery of perishable goods, in accordance with one or more embodiments. Timeline 200 depicts the various events that occur when an order is placed by a customer on a merchant timeline 210 and a courier timeline 211. In various embodiments, a merchant timeline or courier timeline may include additional or fewer events than depicted in FIG. 2. In various embodiments, the events in timeline 200 may be tracked via transmission between a server system and a client devices associated with one or more couriers, merchants, and/or customers, which may be further described with reference to FIG. 7. As used herein, client devices associated with customers may be referred to as "customer devices," client devices associated merchants may be referred to as "merchant devices," and client devices associated with couriers may be referred to as "courier devices." The server system may implement a dynamic ETA estimation system as further described herein.

The events that occur on a merchant timeline 210 may include order creation 212-A, order placement 214, order confirmation 216, order ready 218, and order pickup 220-A. An order creation 212-A may occur when the system receives an order created by a customer. The order may be received at the server system. The order may then be routed to the designated merchant. In some embodiments, the order is routed to the designated merchant by transmitting information corresponding to the order from the server to a merchant device.

The order placement 214 event may occur when the order is received at the merchant device. In some embodiments, the merchant may acknowledge the receipt of the order by transmitting a confirmation, which may trigger the order confirmation 216 event. Order confirmation 216 may signal that preparation of the order has begun by the merchant. In some embodiments, the period of time between order creation 212-A and order confirmation 216 is known as kitchen latency 240.

An order ready 218 event may then occur when preparation of the items in the order is completed and the order is ready for pickup by a courier. Event 218 may be triggered by a merchant confirmation that the order is ready. Such confirmation may be transmitted by the merchant device to the server. The merchant may then wait for a courier to arrive for pickup of the order. When a courier arrives and picks up the order, the order pickup 220-A event occurs. This event may also be triggered by a merchant confirmation that the courier has received the order.

In some embodiments, the events that occur on a courier timeline 211 may overlap or correspond with one or more events on a merchant timeline 210. The events on courier timeline 211 may include order creation 212-B, order assignment 222, parked at merchant 224, arrival at merchant 226, order pickup 220-B, return to vehicle 228, parked at customer 230, and order delivered 232.

In some embodiments, order creation 212-B may correspond to order creation 212-A, and may occur when the system receives an order created by a customer as in event 212-A. In some embodiments, event 212-A and 212-B may be the same event. The system may then assign the order to a courier, thereby triggering order assignment 222. In some embodiments, order assignment 222 may be triggered by confirmation of acceptance of the order by the courier. The system may transmit a notification to a courier device corresponding to the courier. In some embodiments, the period of time between order creation 212-B and order assignment 222 may be known as assignment latency 241.

When order assignment 222 occurs may depend on various factors, including the distance of the courier from the merchant, the travel time of the courier to the merchant, traffic, time of day, etc. In some embodiments, order assignment 222 may not occur until the order has been confirmed by the merchant at 216 or is being prepared by the merchant. In some embodiments, order assignment 222 may not occur until the merchant has confirmed that the order is ready for pickup at 218. As used herein, an assignment of an order or delivery may refer to the pairing of an order with a courier or runner and providing the courier or runner with a delivery opportunity to deliver the order to the corresponding delivery destination, which may be accepted or declined by the courier or runner.

Once an order is assigned at 222, the courier may travel to the merchant location to pick up the order. The courier may then pick up the order upon arrival at the merchant location, and trigger order pickup 220-B. Event 220-B may correspond to order pickup 220-A. In some embodiments, event 220-A and 220-B may be the same event. In some embodiments, event 220-B may be triggered by a courier confirmation that the courier has received the order from the merchant.

In some embodiments, the system may attempt to assign orders and route couriers such that the arrival at merchant 226 coincides with order ready 218. This may optimize the actions of the courier and the merchant to minimize down time, which may occur where courier arrives before the merchant has completed the order, or where the merchant has completed the order before the courier arrives.

In some embodiments, additional events may be tracked between the order assignment 222 and the arrival at merchant 226. For example, the courier may travel to the merchant location by vehicle and then park her vehicle in an appropriate location to reach the merchant. In some embodiments, the courier may confirm that the vehicle is parked by transmitting the confirmation from the courier device to the server, thereby triggering parked at merchant 224. The courier may then have to walk or otherwise travel from the parking location to the merchant. An arrival at merchant event 226 may also occur when the courier has arrived at the merchant location. A confirmation of the courier's arrival may be sent by the courier device and/or the merchant device. In various embodiments, tracking these additional events may provide more accuracy of ETA predictions between order assignment 222 and arrival at merchant 226.

In some embodiments, the courier may have to wait for the order to be completed. After order pickup 220-B, the courier may then travel to the customer location to complete delivery of the order at order delivery 232. Order delivery 232 may occur when the order has been given to the customer. Order delivery 232 may be triggered by confirmation of the delivery by the customer or the courier via corresponding devices.

In some embodiments, additional events may be tracked between the order pickup 220-B and the order delivery 232. For example, the courier may confirm the return to a vehicle after order pickup 220-B at the merchant location. This may be done via confirmation transmitted from the courier device to the server. In some embodiments, confirmation may be manually input or automatically detected via a proximity beacon. For example, the systems used to determine the location of a courier may implement Bluetooth Low Energy (BLE) beacons and BLE-enabled devices that are capable of detecting signals emitted by the BLE beacons.

By using BLE beacons and devices, the system can provide more accurate location information of a delivery associate and can avoid the drawbacks of GPS, cell tower triangulation, and manual location entry. Specifically, the system can be used when there are weak or nonexistent GPS or cell signals. The system also detects location automatically without requiring any input from a delivery associate.

As described in examples of various mechanisms and processes herein, the use of BLE beacons and BLE-enabled devices to provide location services yields increased efficiency and accuracy, in addition to other benefits, for a logistics platform managing real-time, on-demand, deliveries of perishable goods.

As another example, the courier may then park her vehicle in an appropriate location to reach the customer. In some embodiments, the courier may confirm that the vehicle is parked by transmitting the confirmation from the courier device to the server, thereby triggering parked at customer event 230, similar to the parked at merchant event 224. The courier may then have to walk or otherwise travel from the parking location to the customer location. An arrival at customer event (not shown) may also occur when the courier has arrived at the customer location before delivery of the order.

In various embodiments, the tracking of events or milestones may provide guidance to an assignment or routing algorithm to efficiently route couriers. For example, by generating ETA predictions for various events, as described above, may allow for more optimal assignment of couriers for on-demand delivery of perishable goods originating from third party merchants which require specific points of acknowledgement.

However, in some embodiments, merchants may be located in an area with high congestion caused by vehicle or foot traffic. Certain locations may also have insufficient parking. For example, in dense commercial areas, it is often difficult for couriers to both travel and find parking which makes it difficult to complete deliveries quickly. These scenarios may cause time durations between particular events to increase causing inefficiencies in routing deliveries and prolonged delivery times.

For example, a merchant may indicate an order ready event 218 for an order. Ideally, a courier will have parked at merchant 224 and arrived at merchant 226 to pick up the shortly before or after the order ready event 218. However, in an area with high traffic congestion, the courier may not be able to find parking causing the drive time between order assigned 222 and parked at merchant 224 to be longer. Additionally, a courier may be forced to park a longer distance away from the merchant location, causing the walk time between parked at merchant 224 and arrival at merchant 226 to be longer. After an order pickup 220-B by the courier, another prolonged walk time to return to vehicle 228 may also be required in this scenario.

Figure 3:
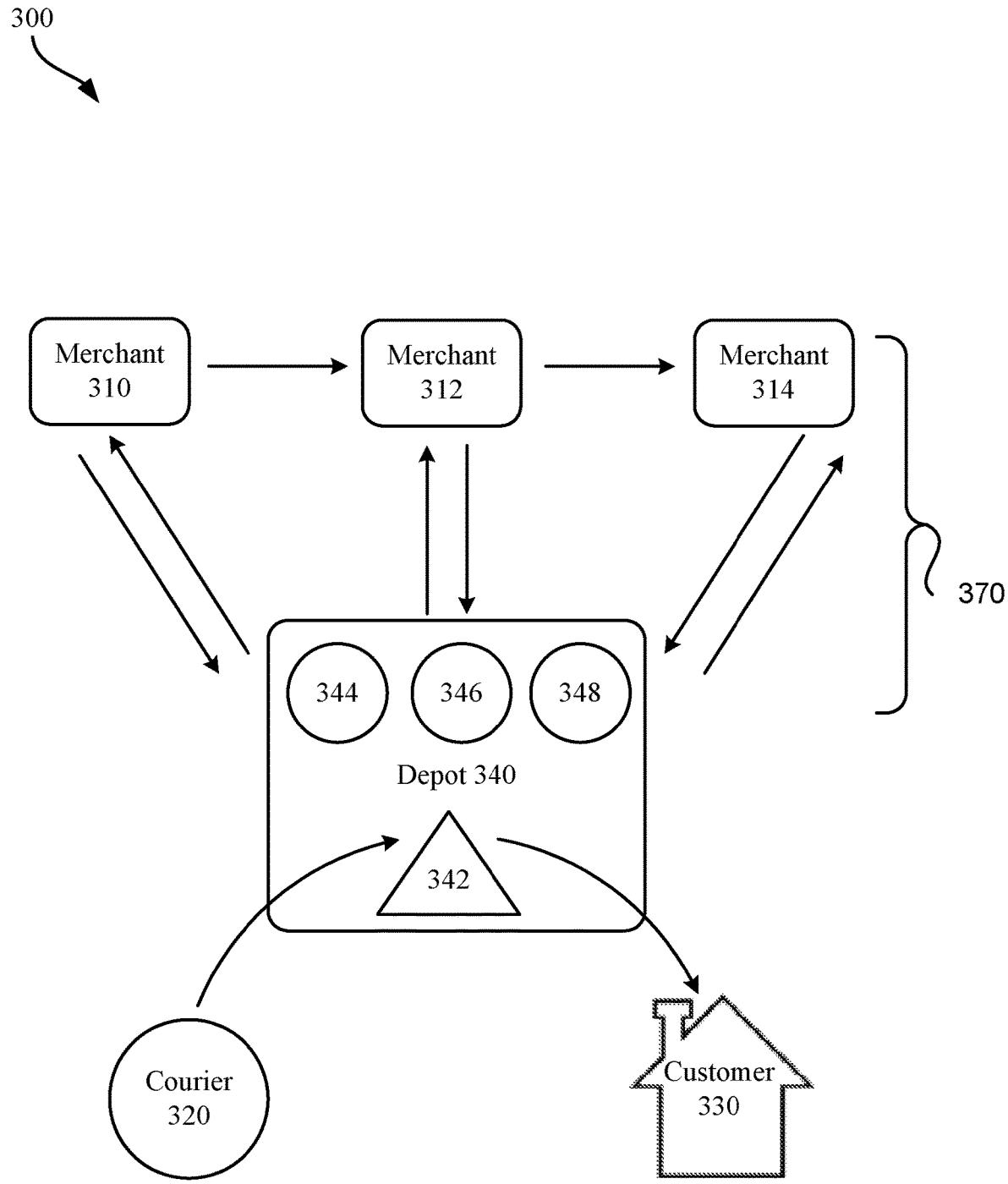
FIG. 3 illustrates an example of a delivery logistics system utilizing a depot dispatch protocol for assigning runners and couriers to deliveries from merchants to customers, in accordance with one or more embodiments.

By implementing a depot dispatch protocol with aggregation depots for assignment of deliveries, courier travel times and other activities may be optimized to make deliveries of perishable goods more efficient. With reference to FIG. 3, shown is an example of a delivery logistics system 300 utilizing a depot dispatch protocol for assigning runners and couriers to deliveries from merchants to customers, in accordance with one or more embodiments.

Like system 100, system 300 may include customers, merchants, and couriers. As shown in FIG. 3, system 300 includes merchants 310, 312, and 314, courier 320, and customer 330. In some embodiments, merchants 310, 312, and 314 may be any one of merchants described with reference to FIG. 1. In some embodiments, courier 320 and customer 330 may be any one of couriers or customers described with reference to FIG. 1. In various embodiments, system 300 may include additional or fewer merchants, couriers, and/or customers than shown in FIG. 3.

In addition, system 300 further includes an aggregation depot 340 with dispatcher 342. In some embodiments, one or more runners 344, 346, and 348 may be stationed at depot 340. In various embodiments, depot 340 corresponds to a predetermined area that has been identified as having high congestion due to vehicle or foot traffic. In some embodiments, various merchants may be located within a predetermined radius of depot 340. For example, depot 340 may be within one (1) mile from each merchant in the corresponding high traffic area.

In some embodiments, runners 344, 346, and 348 may be assigned to travel to one or more merchants to pick up orders that have been confirmed as ready. In some embodiments, each merchant may be designated a particular runner. For example, runner 344 may be assigned to merchant 310, runner 346 may be assigned to merchant 312, and runner 348 may be assigned to merchant 314. However, in some embodiments, a courier may be assigned to pick up orders from more than one merchant. In various embodiments, runners may travel to the assigned merchant on foot. However, in other embodiments, runners may also travel via other means, including skateboards, scooters, bicycles, or other powered or unpowered transportation devices.

In FIG. 3, runner route 370 is depicted. In various embodiments, a runner may travel to its designated merchant to pick up orders as their preparation is completed. In some embodiments, the runner may travel to multiple merchants to pick up multiple orders based on timing of orders and/or distance between merchant locations. The route of a particular runner may be determined by a delivery routing system. The runner may then return to the depot 340 to drop off the order with dispatcher 342. The orders may be grouped into batches of one or more orders by the delivery routing system. A batch of orders may be assigned to courier 320 which can pick up the batch at depot 340 to delivery to customer 330.

Figure 4:
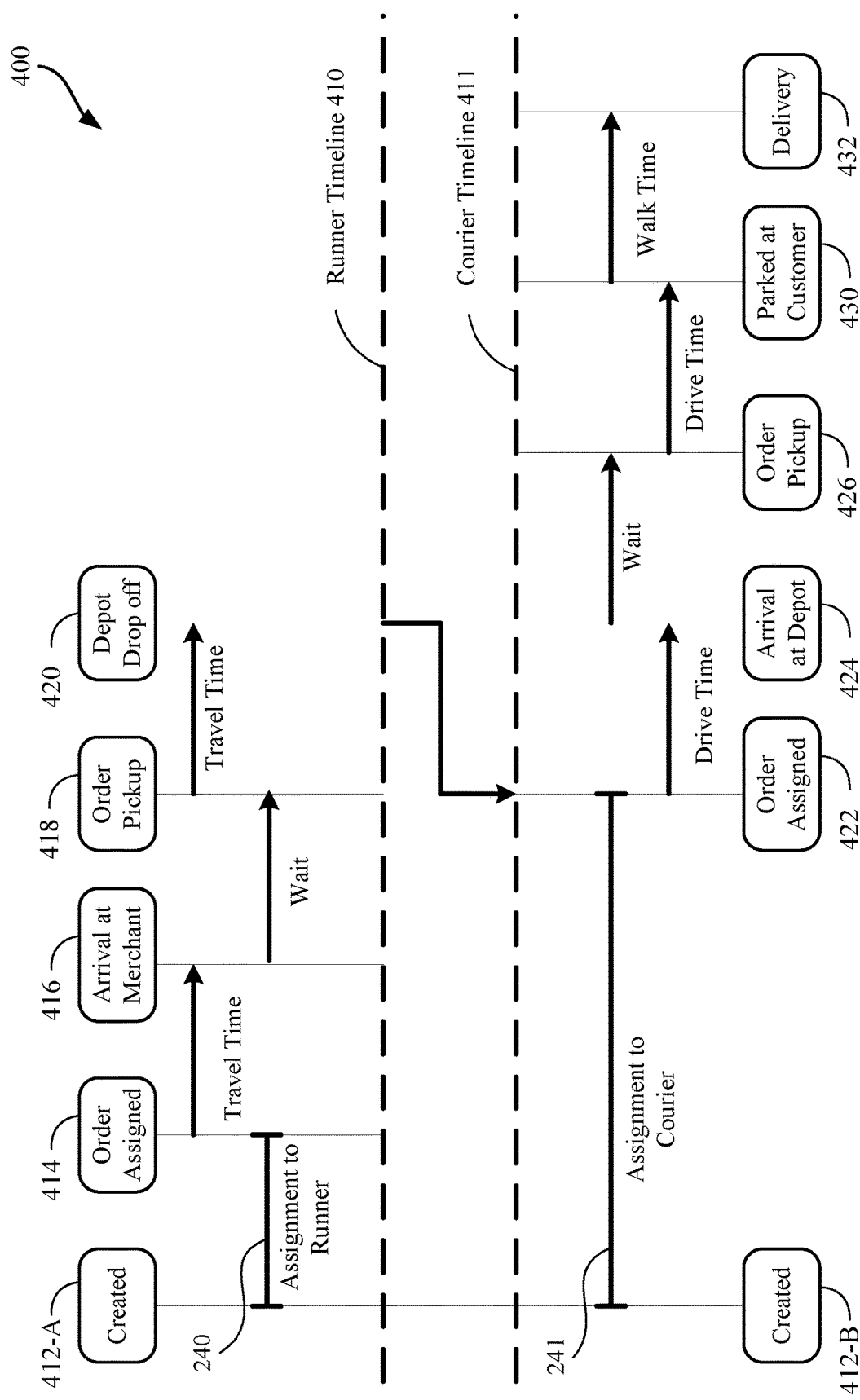
FIG. 4 illustrates another example timeline of delivery events associated with real-time on-demand delivery of perishable goods, in accordance with one or more embodiments.

With reference to FIG. 4, shown is another example timeline 400 of delivery events associated with a depot dispatch protocol, in accordance with one or more embodiments. Timeline 400 illustrates how, in some embodiments, the implementation of a depot dispatch system may optimize courier activity, and thereby delivery efficiency of a system. In various embodiments, timeline 400 depicts the various events that occur when an order is placed by a customer on a runner timeline 410 and a courier timeline 411. In some embodiments, timeline 400 may also run concurrently with merchant timeline 210. In various embodiments, a runner timeline or courier timeline may include additional or fewer events than depicted in FIG. 4. As previously described, the events in timeline 400 may be tracked via transmission between a server system and a client devices associated with one or more couriers, merchants, and/or customers, which may be further described with reference to FIG. 7.

The events that occur on a runner timeline 410 may include order creation 412-A, order assignment 414, arrival at merchant 416, order pickup 418, and depot drop off 420. The events that occur on courier timeline 411 may include order creation 412-B, order assignment 422, arrival at depot 424, order pick up 426, parked at customer 430, and order delivery 432.

An order creation 412-A or 412-B, like order creation 212-A, may occur when the system receives an order created by a customer. The order may then be routed to the designated merchant, such as merchant 310, and placed, such as at event 214. The order may also be assigned to a designated runner, such as runner 344, corresponding to the particular merchant. An order assignment may be sent from a server to a client device corresponding to the runner, such as a runner device. In other embodiments, the order assignment may be sent to a client device corresponding to the dispatcher 342, such as a dispatch device.

The order assigned event 414 may occur upon acknowledgement of the order assignment by runner 344 or dispatcher 342. In some embodiments, runner 344 or dispatcher 342 may acknowledge the order assignment by transmitting a confirmation. The runner 344 may then travel to the location of merchant 310 as the order is confirmed at 216 and/or being prepared by merchant 310.

The arrival at merchant event 416 may occur when the runner 344 arrives at the location of merchant 310. In some embodiments, runner 344 may transmit a confirmation of arrival via the runner device. As previously described, a the arrival of runner 344 may alternatively, and/or additionally, be automatically acknowledged using BLE-enabled beacons and devices.

In some embodiments, the courier may have to wait for the order to be completed before order pickup 418 if arrival at merchant 416 occurs before order ready 218. However, the system may attempt to assign orders and route runners such that the arrival at merchant 416 coincides with order ready 218. This may optimize the actions of the runner and the merchant to minimize down time, which may occur where runner arrives before the merchant has completed the order, or where the merchant has completed the order before the runner arrives.

In some embodiments, runners may be assigned to pick up multiple orders from a single merchant. In some embodiments, runners may be scheduled to arrive at a merchant location when multiple orders are estimated to be ready at 218. The runner may then pick up all the assigned orders at 418.

In some embodiments, runners may be assigned to pick up additional orders from another merchant. Such orders may be grouped and assigned to runner based on the proximity of the first restaurant to the second restaurant and/or a generated route assigned to the runner. Such grouping may be determined by the delivery routing system.

After order pickup 418, runner 344 may then travel back to depot 340 to drop off the order. Once the order is dropped off, runner 344 may transmit a confirmation of depot drop off 420. In some embodiments, dispatcher 342 may transmit the confirmation of depot drop off 420.

Because runners are not traveling in automobiles, there is no need for them to park or spend time finding parking. Additionally, the runners may be able to travel quickly to any merchant in the predetermined high traffic area because the merchants are all located within a predetermined radius of the depot 340. Thus, runners may be able to reach a merchant location to pick up an order much more efficiently than courier 320.

Multiple orders may be picked up by runners and aggregated at depot 340. In some embodiments, the orders may be grouped into batches based on destination and time of depot drop off 420. In various embodiments, the orders may be grouped by a delivery routing system or by dispatcher 342. Each batch of orders may include one or more orders.

Once the orders have been grouped, the batches may be assigned to a courier, such as courier 320. Courier 320 may then travel to depot 340. Upon arrival of courier 320, the courier may transmit a confirmation of arrival to trigger arrival at depot 424. Alternatively, and/or additionally, the arrival of courier 320 may be automatically tracked using BLE beacons and devices. Upon arrival at depot 424, the courier may pick up the assigned order or batches from dispatcher 342. In some embodiments, additional runners may be available to hand off orders such that couriers do not need to park or leave their vehicles at depot 340.

In other embodiments, orders may be located in assigned lockers or other storage for couriers to locate and pick up. For example, some embodiments, may replace dispatcher 342 with an automated system of order retrieval. A smart locker system may be implemented to temporarily store the orders which may be accessed upon authenticating the courier. This would eliminate the need for a dispatcher to oversee the depot and thereby reduce labor and improve efficiency.

In some embodiments, one or more orders may be assigned to couriers before the orders are grouped into batches. As more orders are dropped off by runners, such orders may then be assigned to couriers as additional deliveries. This may optimize the activity of the courier to minimize downtime. For example, by assigning an order to a courier 320 before grouping, the courier 320 may be directed to head toward depot 340 as runner 344 is traveling toward depot 340 such that arrival at depot 424 occurs at the same time or shortly after depot drop off 420 to minimize the wait time between arrival at depot 424 and order pickup 426.

Courier 344 may then travel toward the location of one or more customers, including customer 330 to complete delivery of the order at order delivery 432. Order delivery 432 may occur when the order has been given to the customer 330. Order delivery 432 may be triggered by confirmation of the delivery by the customer or the courier via corresponding devices. In some embodiments, one or more couriers 344 may be already located at depot 340 on standby. This may allow instant assignment to a courier once an order is dropped off at the depot.

As previously described, additional events may be tracked between the order pickup 426 and the order delivery 432. For example, the courier may confirm parking the vehicle near the customer location. This may be done via confirmation transmitted from the courier device to the server. In some embodiments, confirmation may be manually input or automatically detected via a BLE proximity beacon.

The systems described herein greatly improve courier efficiencies. Because couriers do not have to travel through congested areas to pick up orders from merchants, courier time and activity is streamlined. The protocol also introduces a delivery handoff system that does not require couriers to spend time looking for parking or even to park at all. This protocol also addresses the low efficiency of deliveries in high congestion areas by creating aggregation depots that function as "instant pickup points." Since all orders are ready for pickup at the depot, couriers are never at risk of waiting for an order to become ready at the merchant.

These systems further optimize deliveries by streamlining order batching. Since orders are aggregated from different stores into one pickup location, couriers do not have to travel to another merchant to be batched. This makes the batching process more efficient because couriers do not require another leg of travel and parking for additional orders, allowing couriers to make multiple deliveries along a more efficient route.

This protocol may also offer advantages over embodiments where runners were stationed at the merchant location to bring orders to couriers for curbside pickup. In such embodiments, couriers may still need to navigate through busy streets, which may cause downtime and waiting by the stationed runner. Instead, the described protocol requires little to no coordination between couriers, dispatchers, and runners. Their individual responsibilities are well-defined and there is very little friction in either hand-off process.

Figure 5:
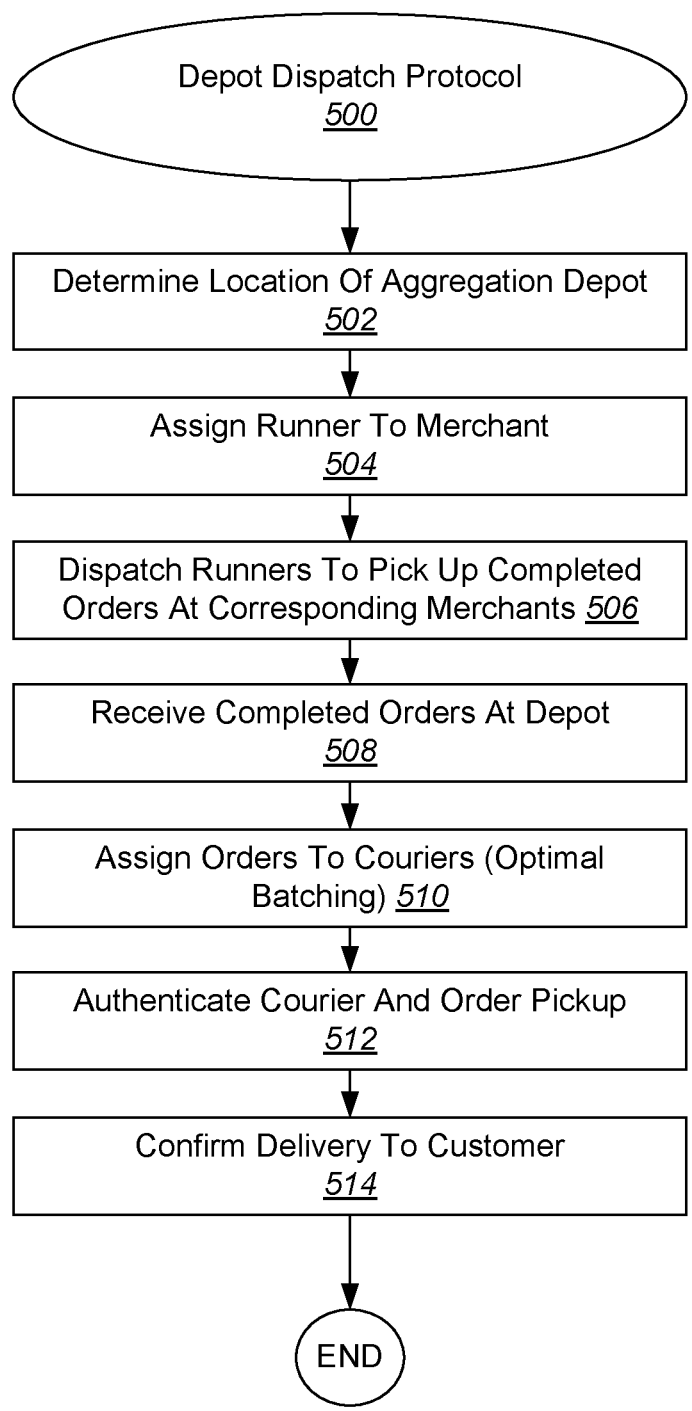
FIG. 5 illustrates an example depot dispatch protocol for assigning runners and couriers to deliveries, in accordance with one or more embodiments.

With reference to FIG. 5, shown is an example depot dispatch protocol 500 for assigning runners and couriers to deliveries, in accordance with one or more embodiments. In various embodiments, depot dispatch protocol 500 may be implemented for optimizing on-demand deliveries. At 502, a location of an aggregation depot, such as depot 340, is determined. The optimal location for an aggregation depot may be based on factors such as traffic congestion, foot traffic, relative location to merchants, ease of accessibility for couriers, delivery density, etc.

At 504, runners are assigned to merchants such that each merchant has at least one designated runner. In some embodiments, a runner may be assigned to multiple merchants. Once orders are placed by customers, the runners are dispatched to pick up completed orders at their assigned merchants at 506. In some embodiments, one or more runners may be assigned to pick up completed orders at more than one merchant location.

At 508, the completed orders are dropped off and received at the depot. A dispatcher, such as dispatcher 342 may acknowledge receipt of an order from a runner. However, in other embodiments, the runner may drop off completed orders at an automated order retrieval system, such as authenticating locker storage units. The runner may then return to the assigned merchant location to pick up additional orders.

At 510, the orders are assigned to couriers. The dispatcher may assign orders at the depot to nearby dashers via an application on the dispatcher device. In other embodiments, the orders may be automatically assigned by the delivery routing system based on optimal routes and ETA predictions. In various embodiments, optimal batching of orders may be computed to group the completed orders into one or more groups based on various factors, such as delivery location, time of order, etc. Such grouping may be implemented by a delivery routing system. For example, the delivery routing system may implement a routing algorithm in order to maximize the efficiency of deliveries from the depot to customers. In various embodiments, the routing algorithm may determine whether to assign an order or wait for a potentially more optimal batch including subsequent orders. In some embodiments, the routing algorithm may include neural networks and computer learning algorithms for predicting and determining order groupings and assignments.

Various systems and processes for grouping and assigning deliveries of orders for perishable goods are described in U.S. patent application Ser. No. 15/826,736 titled SYSTEM AND METHOD FOR DYNAMIC PAIRING FUNCTION OPTIMIZATION by Chopra et al., filed on Nov. 30, 2017, which application is incorporated by reference herein in its entirety and for all purposes.

Once an order or group of orders is assigned to a courier, that courier will travel to the depot to pick up the order. At 512, the courier is authenticated and the pickup of the order is confirmed. In some embodiments, one or more runners may be stationed at depot 340 to hand off assigned orders to the couriers such that couriers need not park their vehicles. In other embodiments, couriers may be directed to the locker location storing their assigned orders and authenticate with the automated storage system to retrieve the assigned orders. Once the assigned orders are collected by the courier, the courier travels toward the customer location to complete the delivery. Delivery of the order to the customer may be confirmed at 514.

Figure 6:
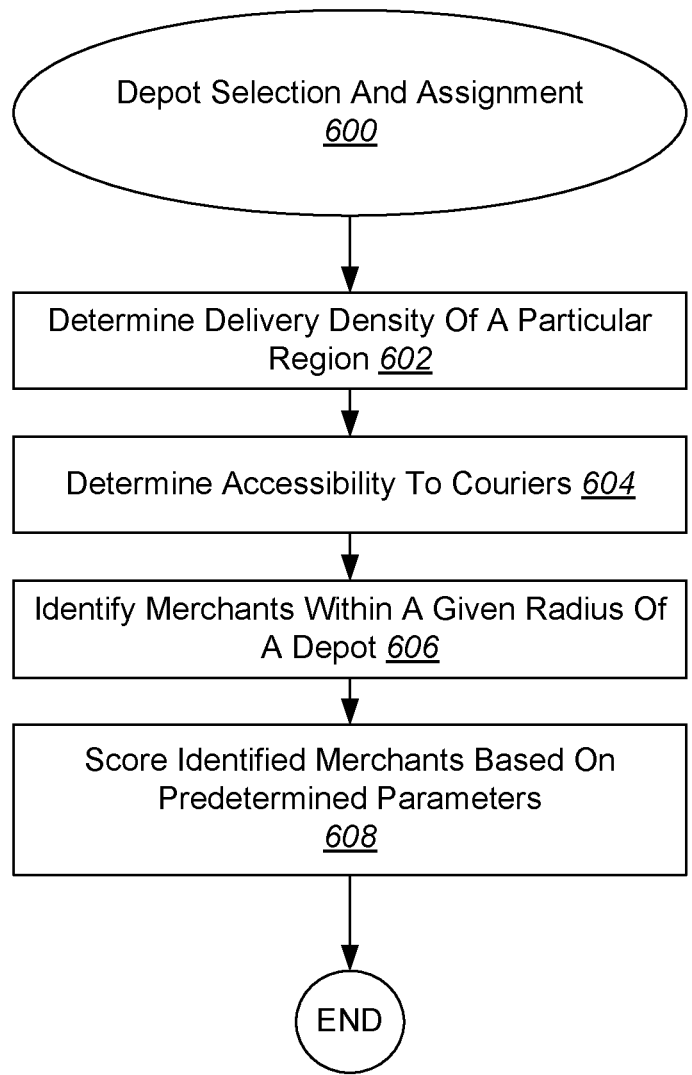
FIG. 6 illustrates an example process for depot selection and assignment, in accordance with one or more embodiments.

With reference to FIG. 6, shown is illustrates an example process flow 600 for depot selection and assignment, in accordance with one or more embodiments. In some embodiments, process flow 600 may correspond to step 502 in dispatch protocol 500. At 602, the delivery density of a particular region is determined. In various embodiments, the operation of an aggregation depot must increase the efficiencies of couriers enough to cover the operational costs of the depots and runners. In other words, the aggregation depot must be located in an area such that increased courier efficiencies will generate additional revenue from increased order deliveries that are greater than or equal to the operational costs of the depot and the runners. Thus, delivery density may be an integral factor.

In various embodiments, determining delivery density may include determining delivery volume in the particular region. This may include the average orders per hour in the particular region. This may include all orders made for all merchants in defined region at a given time. The merchants in a particular region may be referred to herein as "target merchants." In some embodiments, delivery volumes may also be factored into delivery density. This may correspond to the number of deliveries of orders from target merchants at a given time. Low delivery volumes may correspond to difficulty for couriers in traveling to merchant locations to pick up orders. Thus, in some embodiments, regions with delivery volumes below a predetermined threshold may be identified as potential sites for depot placement.

Additionally, order pickup rate may also be factored into delivery density. This may correspond to the ratio of the number of orders picked up to the number of outstanding ready orders at a given time. A lower order pickup rate may also indicate difficulty of couriers reaching merchant location to pick up ready orders. In some embodiments, the average duration between order ready 218 and order pickup 220-A or 220-B may be calculated. If the average duration for target merchants is above a predetermined threshold, the region may be identified as a potential site for depot placement.

In some embodiments, average travel times of couriers to target merchant locations may be tracked. For example, the region of target merchants may be defined by a boundary. Historical data may be used to determine the travel times of couriers from the outer border of the boundary to a target merchant location. These travel times may be aggregated and compared to average travel times in other regions. Various other factors may also be considered in determining delivery density and appropriate sites for depot placement.

At 605, the accessibility to couriers is determined. This may be determined to identify the optimal target site to operate a depot. This may be based on the relative foot and vehicle traffic around the location. May consider traffic lights, proximity to landmarks such as schools, churches, etc. A site with less traffic and congestion may be selected because courier vehicles may be able to reach the target site more efficiently. In some embodiments, average travel times of couriers to the target site location. Travel times from the outer border of the boundary to the location may be tracked or predicted. In some embodiments, a target site with an average travel time from the outer border that is above a predetermined threshold may be eliminated from consideration.

At 606, merchants within a given radius of the depot location are identified. In some embodiments, a target site for a depot may require a minimum amount of merchants to be within a predetermined distance of the depot location. The depot should also be reasonably close to a set of target merchants.

At 608, the identified merchants are scored based on predetermined parameters. Such parameters may be weighted and/or scored to generate a score for the target merchants. The target merchants that score above a predetermined minimum threshold may be assigned runners at the corresponding depot.

In some embodiments, the parameters may include food type, average number of orders placed, average price of orders, distance from the depot, etc. In some embodiments, certain merchants may be filtered out by food type. For example, ice cream or other temperature sensitive goods may not be suitable to be stored at the depot. However, in some embodiments, automated order retrieval systems may include refrigerated lockers that may be used to store ice cream and other temperature sensitive goods for couriers to pick up. In some embodiments, a depot may have a maximum amount of merchants that may be assigned to its operation.

Figure 7:
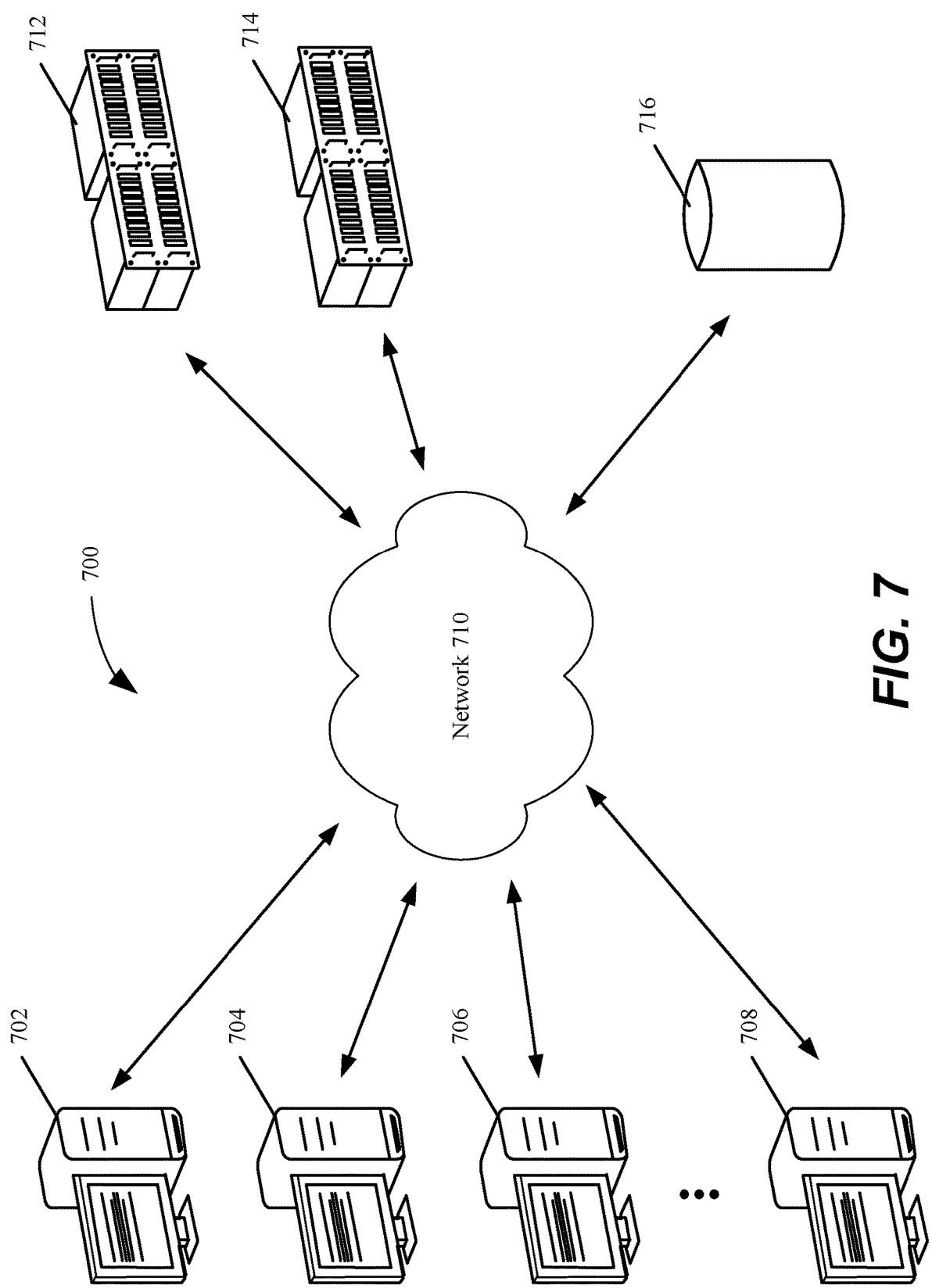
FIG. 7 illustrates a diagram of an example network architecture for implementing various systems and methods of the present disclosure, in accordance with one or more embodiments.

In various embodiments, one or more of the events described herein may be transmitted to a client devices corresponding to customers, merchants, or couriers. FIG. 7 illustrates a diagram of an example network architecture 700 for implementing various systems and methods of the present disclosure, in accordance with one or more embodiments. The network architecture 700 includes a number of client devices 702-708 communicably connected to one or more server systems 712 and 714 by a network 710. In some embodiments, server systems 712 and 714 include one or more processors and memory. The processors of server systems 712 and 714 execute computer instructions (e.g., network computer program code) stored in the memory to perform functions of a network data exchange server. In various embodiments, the functions of the network data exchange server may include routing real-time, on-demand, delivery of perishable goods, and/or predicting and dynamically updating estimated time of arrivals (ETAs) for such deliveries.

In some embodiments, server system 712 is a content server configured to receive and store network profile information. In some embodiments server system 714 is a dispatch server configured to transmit and/or route network data packets including network messages. In some embodiments, content server 710 and dispatch server 712 are configured as a single server system that is configured to perform the operations of both servers.

In some embodiments, the network architecture 700 may further include a database 716 communicably connected to client devices 702-708 and server systems 712 and 714 via network 710. In some embodiments, network data, or other information such as user information, courier information, and merchant information, may be stored in and/or retrieved from database 716.

Users of the client devices 702-708 access the server system 712 to participate in a network data exchange service. For example, the client devices 702-708 can execute web browser applications that can be used to access the network data exchange service. In another example, the client devices 702-708 can execute software applications that are specific to the network (e.g., networking data exchange "apps" running on smartphones).

Users interacting with the client devices 702-708 can participate in the network data exchange service provided by the server system 712 by distributing digital content, such as text comments (e.g., updates, announcements, replies), digital photos, videos, online orders, payment information, activity updates, location information, or other appropriate electronic information. In some implementations, information can be posted on a user's behalf by systems and/or services external to the network or the server system 712.

For example, the user may post a review of a movie to a movie review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 702-708 can be computing devices such as laptop or desktop computers, smartphones, personal digital assistants, portable media players, tablet computers, or other appropriate computing devices that can be used to communicate with an electronic social network. In some implementations, the server system 712 can include one or more computing devices such as a computer server. In various embodiments, each of client devices 702-708 may be any one of merchant devices corresponding to merchants 110-116, courier devices corresponding to couriers 120-128, or customer devices corresponding to customers 130-136.

In some implementations, the server system 712 can represent more than one computing device working together to perform the actions of a server computer (e.g., cloud computing). In some implementations, the network 710 can be a public communication network (e.g., the Internet, cellular data network, dial up modems over a telephone network) or a private communications network (e.g., private LAN, leased lines).

Figure 8A:
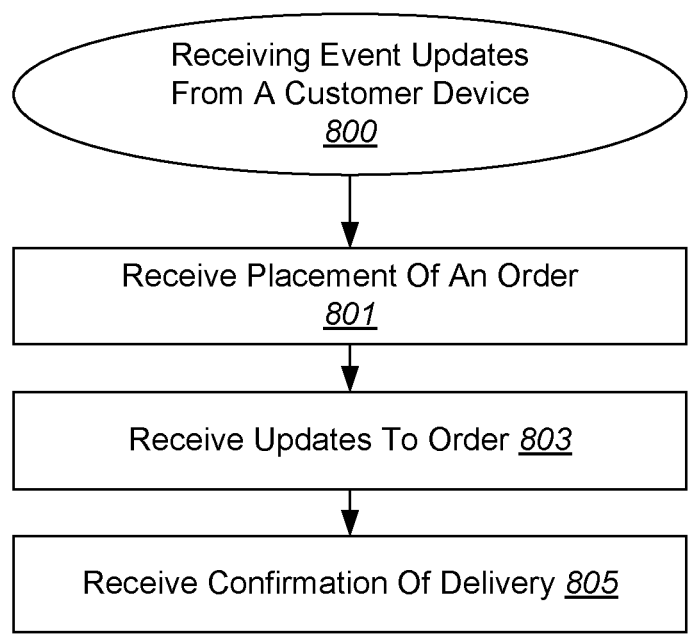
FIGS. 8A, 8B, and 8C illustrate example processes for processing of various events and time stamps using weight factors, in accordance with one or more embodiments.
Figure 8B:
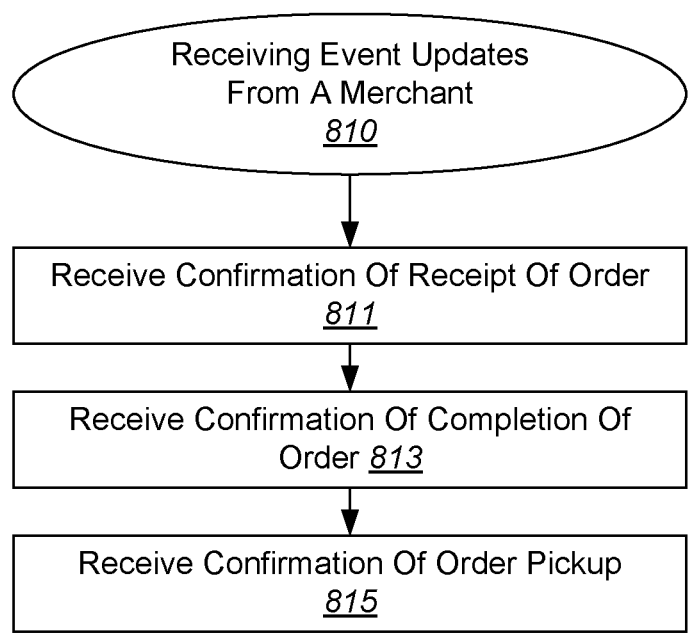
Figure 8C:
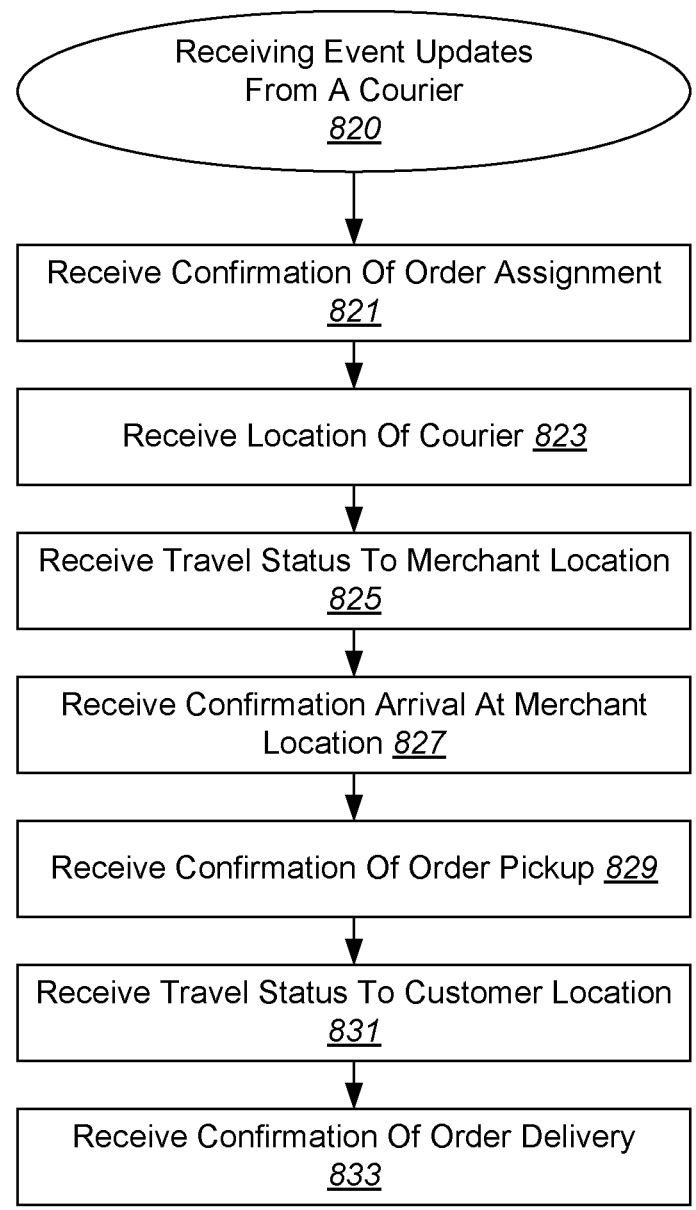

Various customers, merchants, and couriers may transmit information related to one or more orders to the servers 712 or 714 via corresponding client devices. As previously described, such information may include order information, payment information, activity updates, timestamps, location information, or other appropriate electronic information. The system may then utilize this information to calculate the ETA of the delivery of the order, as well as dynamically updating the ETA when updated timestamps are received. With reference to FIGS. 8A-8C, shown are example methods for receiving multiple events and timestamps, in accordance with one or more embodiments.

FIG. 8A depicts an example flow chart of an example process 800 for receiving event updates from a customer device. At 801, a placement of an order is received. In some embodiments, an order may be placed by a customer on a corresponding customer device, such as 702-708. In some embodiments, the order may be places in a web browser or an application installed in the customer device. The order information may be transmitted via network 710. The order placement may include location information corresponding to the location for delivery of the order. For example, the location of the customer device may be determined via GPS. As another example, the location information may include an address corresponding to the customer. Order placement may further include additional information, such as ordered items, payment information, and other customer information. In some embodiments, the receipt of an order at 801 may correspond to the order creation event 212-A and/or 212-B.

In some embodiments, updates to the order may be received at 803. In some embodiments, order updates may include addition or removal of various items in the order, cancellation of the order, changes in delivery location, etc. In some embodiments, updates to the order may be factored into the predicted ETA of order delivery. In some embodiments, a confirmation of delivery may be received from the customer device at 805. For example, the customer may transmit a confirmation of delivery via the customer device once the order is received from the courier. However, in some embodiments, confirmation of delivery may be transmitted by the courier via a corresponding courier device, as further described with reference to FIG. 8C. In some embodiments, receiving updates to the order may be an optional implementation.

FIG. 8B depicts an example flow chart of an example process 810 for receiving event updates from a merchant device. A confirmation of receipt of order may be received at 811. In some embodiments, an order may be routed over network 710 by the system to the merchant device associated with the appropriate merchant. The merchant may then transmit a confirmation of receipt of the order, which may trigger the order confirmation event 216. In some embodiments, the confirmation of receipt order at 811 may be automatically transmitted via network 710 to the system 712 once the order has been successfully routed to and received by the merchant device.

Once the merchant has completed the preparation of the order, a confirmation of completion of order may be received at 813. The confirmation of completion of order may trigger the order ready event 218. A confirmation of order pickup may then be received at 815 and trigger the order pickup event 220-A. The merchant may transmit the order pickup confirmation via the merchant device once the courier has picked up the order. However, in some embodiments, confirmation of order pickup may be transmitted by the courier via a corresponding courier device, as further described with reference to FIG. 8C.

FIG. 8C depicts an example flow chart of an example process 820 for receiving event updates from a courier device. At 821, a confirmation of order assignment may be received. In some embodiments, the confirmation of order assignment may be an acceptance of the order assignment input by the courier on the courier device. At 823, the location of the courier may be received. In some embodiments, the location of the courier may be tracked and updated in real time. In some embodiments, the location of the courier may be tracked via the courier device, such as by using real-time GPS coordinates. In some embodiments, the location of the courier may be additionally tracked using proximity beacons.

In various embodiments, the courier may travel to the merchant location after order assignment 222. As the courier travels to the merchant location, the travel status to the merchant location may be received at 825. In various embodiments, the travel status may include the status of the vehicle corresponding to the courier. For example, the courier device may transmit a notification to the server system that the courier has parked his vehicle near the merchant location. This may correspond to the parked at merchant event 224.

Upon the courier's arrival at the merchant location, a confirmation of arrival at merchant location may be received at 827. In some embodiments, the confirmation of arrival at merchant location may be a check-in status update input by the courier on the courier device and transmitted via network 710. Once the order is provided to the courier, a confirmation of order pickup may be received at 829. In some embodiments, the confirmation of order pickup may be confirmed by the courier via the courier device. As previously described, the confirmation of order pickup may additionally, and/or alternatively, be confirmed by the merchant via the merchant device.

In various embodiments, the courier may travel to the customer location after order pickup 220-B. As the courier travels to the customer location, the travel status to the customer location may be received at 431. In various embodiments, the travel status may include the status of the vehicle corresponding to the courier. For example, the courier device may transmit a notification to the server system that the courier has returned to the vehicle after the order pickup. This may correspond to the return to vehicle event 228. As another example, the courier device may transmit a notification to the server system that the courier has parked his vehicle near the customer location. This may correspond to the parked at customer event 230.

Next, a confirmation of order delivery may be received at 433 from the courier device. In some embodiments, the confirmation of order delivery may be confirmed by the courier via the courier device. As previously described, the confirmation of order delivery may additionally, and/or alternatively, be confirmed by the customer via the customer device.

In some embodiments, processes 800, 810, and 820 may be integrated within a single process. In some embodiments, the described system may receive additional or fewer event updates than depicted in FIGS. 8A-8C.

In some embodiments, the travel status of the courier at various points in timeline 200 may be tracked via a proximity system, which includes one or more beacons. Various systems and processes for determining the location of a courier using proximity sensors and/or beacons are described in U.S. patent application Ser. No. 15/826,737 titled IMPROVING PREDICTIONS BY USING BEACONS IN A REAL-TIME LAST MILE LOGISTICS PLATFORM by Hsieh et al., filed on Nov. 30, 2017, which application is incorporated by reference herein in its entirety and for all purposes.

For example, BLE beacon sensors may be placed in the courier's vehicle, which may be configured to detect a beacon device corresponding to the courier location. In some embodiments, the beacon device may be a client device associated with the courier. Additionally, beacon sensors may be located at one or more merchant locations. In some embodiments, the courier device may include the beacon sensor and beacon devices may be located at the courier's vehicle or various merchant locations. As the courier, and the corresponding courier device, travels toward and away from various beacons, the location real-time location of the courier may be tracked.

For example, if it is detected that the distance between the courier and the courier's vehicle increases after order assignment 222, but before order pickup 220-B, then it may be determined that the courier has parked the vehicle and is moving toward the merchant location. As another example, the courier may be determined to be walking toward the merchant location via proximity sensors located at one or more nearby merchant locations, as well as the target merchant location, which are configured to detect the beacon device corresponding to the courier's location. Arrival at merchant 226 may also be determined when the courier device is brought within a predetermined radius of a beacon sensor at the merchant location.

The travel status of the courier may also be tracked after order pickup 220-B and before order delivery 232. If it is detected that the distance between the courier and the merchant location increases, then it may be determined that the courier is leaving the merchant location and traveling toward the vehicle. As another example, once the courier moves within a predetermined radius of the vehicle, the proximity sensors may determine that the return to vehicle event 228 has occurred, and an additional travel status to customer location may be received at 831. Subsequently, if it is detected that the distance between the courier and the courier's vehicle increases, then it may be determined that the courier has parked the vehicle and is moving toward the customer location to deliver the order.

Additionally, after order delivery 232 occurs, the proximity system may determine that the courier has returned to the vehicle when the courier has traveled within a predetermined radius of the vehicle. This may indicate that the courier is ready to be given another order assignment. In various embodiments, other events indicating travel status of the courier to the merchant may be tracked at 825 and 831.

Figure 9:
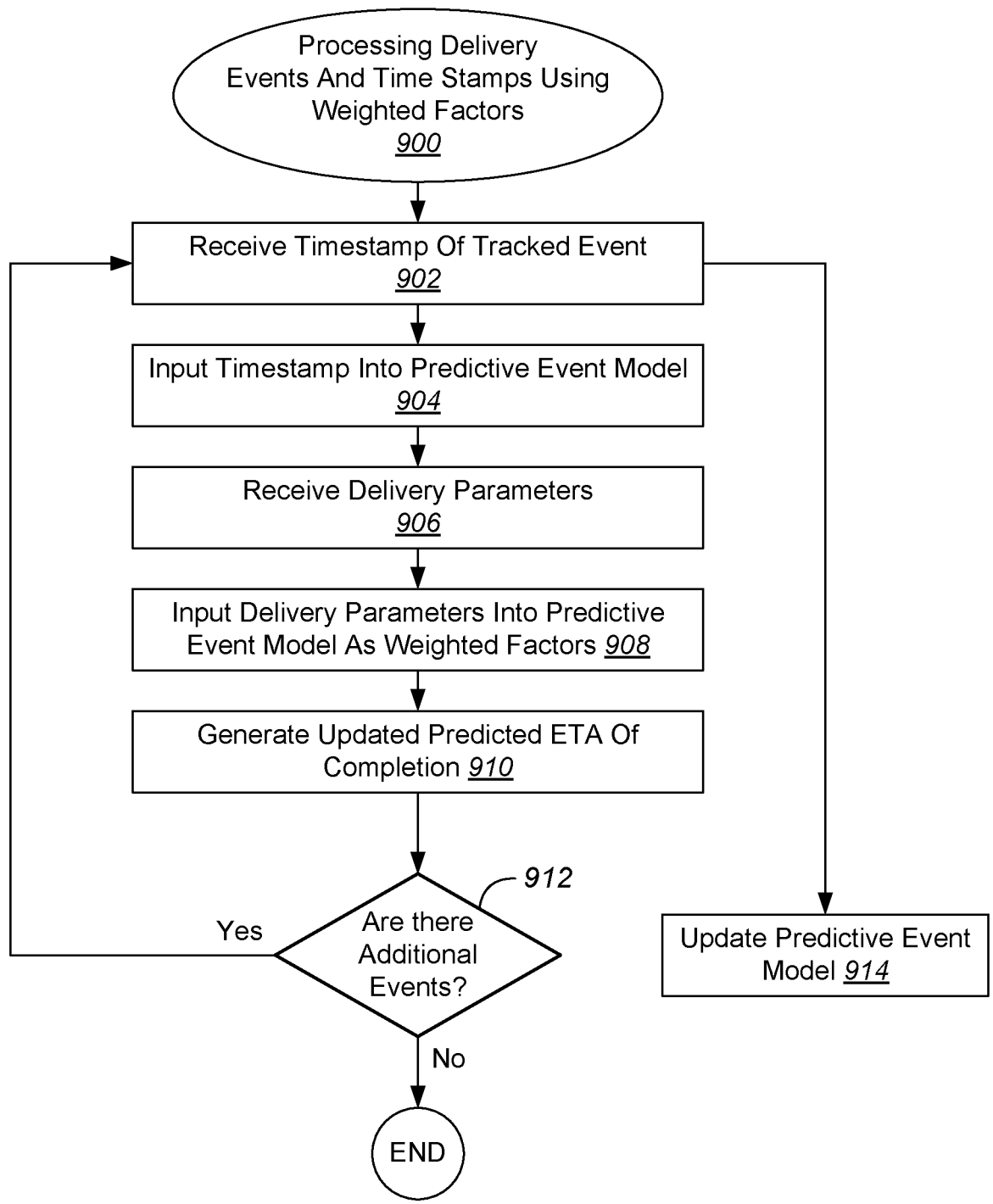
FIG. 9 illustrates a method for dynamic estimated time of arrival predictions, in accordance with one or more embodiments.

FIG. 9 illustrates and example process 900 for processing of delivery events and time stamps using weighted factors, in accordance with one or more embodiments. At 902, a timestamp of an event corresponding to an order is received. In various embodiments, the order may be an order placed by a customer via a customer device. In some embodiments, the event may be any one of events described with reference to FIG. 2, and received as described with reference to FIGS. 8A-8C.

At 904, the timestamp is input into a corresponding predictive event model. In some embodiments, a neural network is implemented to generate an estimated time of arrival (ETA) for a particular order. Such systems may learn (or progressively improve performance) to do tasks by considering examples, generally without task-specific programming, such as generate accurate ETA predictions. In some embodiments, the neural network provides a predictive model to input a timestamp associated with an event and generate predictive ETAs for one or more subsequent delivery events.

In some embodiments, the neural network may comprise a plurality of subnetworks, each of which function as a predictive event model to generate an estimated length of time for a particular interval of time between subsequent delivery events. As used herein, the terms "subnetwork" and "event model" may be used interchangeably, unless otherwise noted. In some embodiments, each interval between events, such as those events illustrated in FIG. 2, may be associated with a subnetwork. In other words, a particular predictive event model may predict a duration between one event to the next, as shown in FIG. 2.

At 906, delivery parameters corresponding to the order are received. Delivery parameters may include various factors or measurements that may affect the length of time between one or more tracked events. In various embodiments, delivery parameters may include time, date, traffic, weather, historical courier performance, and size of markets. Delivery parameters may further include the number of orders received, the number of items in an order, the type of dishes in an order, the sub-total of an order, the historical restaurant data. In various embodiments, various other parameters may be implemented in the neural network.

At 908, the delivery parameters are input into the corresponding predictive event model as weighted factors. In various embodiments, the neural network may be trained to correlate the various parameters with particular effects on time durations between successive events. The neural network may assign weights to such parameters creating weighted factors. Such weights may be adjusted based on actual time of arrivals.

For example, certain dates may fall on holidays that are historically known to be busy days. Thus, certain holidays may be correlated with increased traffic or increased number of orders placed. Additionally, certain times of the day may be associated with heavier traffic, such as during rush hours. In some embodiments, the time of day is a parameter that is continuously updated in real-time and input into the neural network.

In some embodiments, traffic information may be tracked in real-time. In some embodiments, traffic information may be tracked by a third party application. In some embodiments, traffic data is updated in real-time, or constantly updated in near real-time.

Parameters corresponding to weather may also inform traffic or order impact. For example, inclement weather may correlate with heavier traffic due to hazardous conditions. Inclement weather may also correlate with more orders placed since customers may be more likely to stay indoors. Weather parameters may also correspond to change in demands for particular food types. For example, more ice cream may be ordered during hot days.

In some embodiments, the size of markets may correspond to the number of individuals in a certain market who are potential customers, couriers, and/or merchants of a product or service. As used herein, the term market may be used to mean either a particular merchant, or a group of merchants associated with a particular product type. However, in some embodiments, the term market may refer to the total customers, couriers, and/or merchants in a given area that is part of the on-demand logistics platform. The neural network may identify particular market sizes as correlated with certain differences in times for order preparation or delivery. The size of markets may also correspond to new and more mature markets. For example, a newer market may be correlated with longer order preparation times, while more mature markets may be correlated with faster order preparation times.

Another input parameter may include fleet load factor, which corresponds to the ratio of number of orders outstanding to the number of couriers outstanding. In some embodiments, the higher this ratio of fleet load factors may correspond to an insufficient amount of couriers, and thus longer time durations for events after order ready 218.

In some embodiments, the item types in an order may be input as parameters. For example, certain dishes may be correlated with particular preparation times. In some embodiments, the size of an order may be input as predictive parameters. In some embodiments, more items within an order may correlate to longer preparation times. In some embodiments, the sub-total price of an order may also correspond to order size or order preparation time. For example, a larger sub-total may correlate to a larger amount of items within the order. Additionally, more expensive items may take longer to make, due to more ingredients, more difficulty, or more specialization in preparation.

In some embodiments, the neural network may determine the average rate for time durations between one or more events on a courier timeline 210 for couriers in a given predetermined area. Similarly, in some embodiments, the neural network may determine the average rate for time durations between one or more events on a merchant timeline 210 for a particular merchant. However, historical performance may also be input as parameters.

The historical performance of a courier may be a record of the previous time durations between one or more events on courier timeline 211 for a particular courier. This record may be compared to the average time durations between one or more events on courier timeline 211 for all couriers within a given area. The neural network may use this factor to assign a particular state variable to a given courier to adjust predictions accordingly. For example, a given courier may have shorter time durations between particular events, such as between parked at merchant 224 and arrival at merchant 226, as compared to the average for a given area. The neural network may adjust the ETA prediction for arrival at merchant 226 accordingly for this particular courier.

The historical performance of a particular merchant may also be input. This may include the average time duration between events on merchant timeline 210 for that particular merchant. The neural network may use this factor to assign a particular state variable to a given merchant to adjust predictions accordingly. For example, the average time for a particular merchant to prepare a particular item may be tracked and determined. As an example, some merchants may not transmit a confirmation of receipt of order, such as at step 911, but instead immediately begin preparation of the order. Once the order has been complete, the merchant may then transmit the confirmation of receipt of order and confirmation of completion of order simultaneously. The neural network may determine an ETA prediction accordingly such that a delivery routing system may appropriately assign a courier at the optimal time.

In some embodiments, historical performance parameters may be organized into aggregate units for a predetermined amount of time. For example, the historical performance of a courier or merchant for the previous thirty (30) day increment is given higher weighted values. In some embodiments, the historical performance parameters for days occurring before the previous thirty (30) days are also input with lower weighted values. In some embodiments, the historical performance parameters for days occurring before the previous thirty (30) days may be discarded.

In various embodiments, weights assigned to particular parameters may be updated based on other parameters. For example, the weight given to traffic may be adjusted in real-time as the time changes from peak rush hour to after rush hour. In some embodiments, one or more parameters may cause the neural network to maintain a particular state variable.

At 910, an updated predicted estimated time of arrival (ETA) is generated. The parameters and timestamp are input into various computational layers of the subnetwork. In some embodiments, such computational layers may include, but are not limited to, linear layers, convolution layers, deconvolution layers, residual layers, quadratic layers, etc. In some embodiments, the timestamp of an event, or actual time of arrival (ATA) for the event, is input into one or more computational layers of a predictive model to output a predicted ETA for the delivery of the order, such as order delivery 232.

In other embodiments, the ATA of an event is input into one or more computational layers to output a predicted ETA for a subsequent delivery event. Then, the output predicted ETA is input into additional computational layers of another predictive model to determine additional predicted ETAs for additional delivery events. In some embodiments, each computational layer in a subnetwork may correspond to one or more parameters.

In some embodiments, a predicted ETA may be generated for each event on timelines 210 and 211. Predicted ETAs may also be generated for one or more events on timelines 410 and 411. In some embodiments, the predicted ETAs for one or more events may be transmitted to various client devices, such as customer devices, merchant devices, and courier devices. The predicted ETAs may further be used for delivery routing system for assignment of orders to couriers and merchants for delivery.

This approach divides the delivery process into distinct delivery events that are more predictable because they depend on unique features of the merchant, such as order protocol, food preparation speed, etc. Furthermore, the disclosed system provides increased capability of receiving the timestamp data for each delivery event through various applications and devices. Thus, there is a natural way to incorporate real-time updates to ETA predictions based on events that take place during a delivery.

At 912, it is determined whether additional events exist for the delivery. If an ATA for the final event, such as order delivery 232, has been received, then process 900 ends. However, if additional events exist, then process 900 returns to operation 902 to receive the timestamp of a subsequent event. The timestamp of the subsequent event may be used by the neural network to train itself by comparing the timestamp of the subsequent event with the predicted ETA at 914.

At 914, a corresponding event model is updated. In some embodiments, the processor dynamically generates the plurality of ETA time durations by continuously training a predictive event model using the plurality of weighted factors. In various embodiments, the weights may also be adjusted based on timestamps corresponding to ATAs of various delivery event updates that are received as described in FIGS. 8A-8C. When an event update is received, the neural network may compare the ATA with the predicted ETA for a particular event and analyze and differences. Based on the comparison, the neural network may update weights given to particular parameters to account for any differences between the predicted ETA and the received ATA for an event. As such, the predictive models in the neural network of the dynamic ETA prediction system are continuously being trained during operation.

Figure 10:
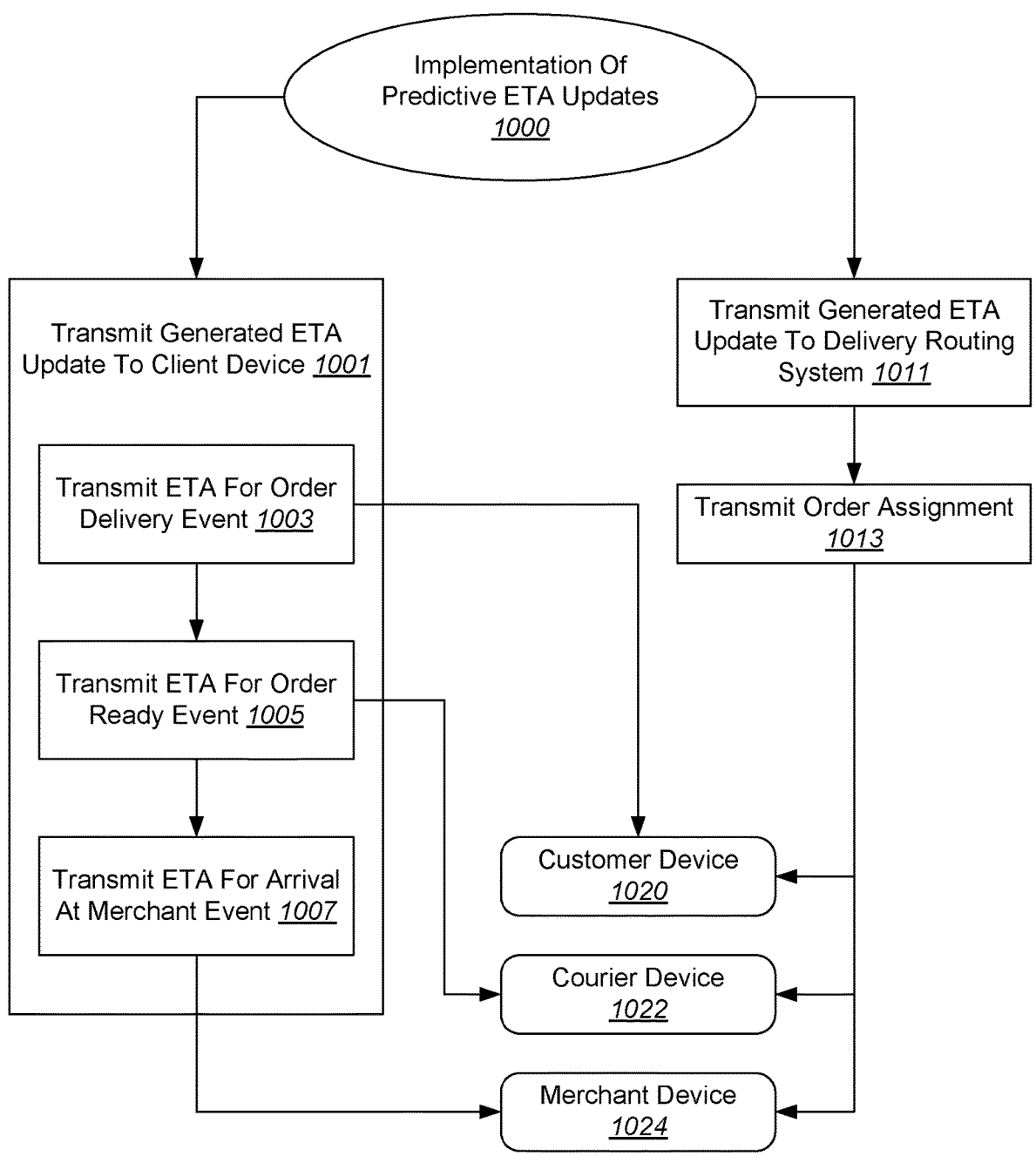
FIG. 10 illustrates an example flow process for implementation of predictive ETA updates, in accordance with one or more embodiments.

FIG. 10 illustrates an example flow process 1000 for implementation of predictive ETA updates, in accordance with one or more embodiments. As previously described, the described systems may generate predictive ETA updates for one or more delivery events, including completion of the order by the restaurant, pickup of the order by the courier, and completion of delivery of perishable goods to the customer. Such predictive ETA updates may be transmitted to various client devices at 1001. As shown in FIG. 10, such client devices include customer device 1120, courier device 1022, and merchant device 1024. Client devices 1020, 1022, and 1024 may be any one of client devices 702-708, as shown in FIG. 7.

For example, at step 1003, a predicted ETA for order delivery 232 may be provided to the customer device 1020. As another example, at step 1005, the predicted ETA for order ready 218 may be provided to the courier device 1024 to notify the courier that it is ready for pickup. As a further example, at 1007, the predicted ETA for arrival at merchant 226 may be provided to the merchant device 1024 to notify the merchant when to expect a courier to arrive. One or more predicted ETA updates for various other events may be transmitted to any one of client devices 1020, 1022, and 1024.

The disclosed systems may also provide a delivery routing system with timestamps necessary to make informed decisions on when deliveries should be assigned to a courier. In some embodiments, the predicted ETA updates are transmitted to a delivery routing system at step 1011. Such delivery routing system may input the ETA updates into an assignment algorithm to assign couriers to a plurality of received orders. In some embodiments, the delivery routing system may assign subsequent orders to a courier based on the predicted ETAs for various events. For example, a subsequent order may be assigned to a courier that is currently en route to a customer location based on the predicted ETA for the order delivery 232. In some embodiments, the assignment of a subsequent order may also depend on the predicted ETA of the order ready event 218 of the subsequent order, as well as distance and travel time parameters of the courier to the merchant corresponding to the subsequent order.

In various embodiments, at step 1013, the order assignment may be transmitted to a customer device 1020 to notify the customer of information corresponding to the courier, such as identification, contact information, etc. In some embodiments, the order assignment may be transmitted to the courier device 1022 to notify the courier of information corresponding to the merchant and/or customer, such as location, contact information, order information, etc. In some embodiments, the order assignment may be transmitted to the merchant device 1024 to notify the merchant of information corresponding to the customer and/or courier, including contact information.

In some embodiments, the delivery routing system may assign multiple orders to the same courier. For example, multiple orders being delivered to customer locations that are within a predetermined distance may be assigned to the same courier to optimize a travel route for delivery. In some embodiments, the predicted ETAs for order ready events 218 of such multiple orders may be input to determine whether a single courier should be assigned to pick up the multiple orders.

Additionally, it provides a method for pinpoint issues to determine which part of a delivery went wrong by comparing predicted and actual event timestamps. In some embodiments, the plurality of ETA time durations may be used to escalate issues and determine which part of a delivery went wrong by comparing predicted and actual event timestamps. For example, any large discrepancies between predicted ETAs and ATAs for events in a delivery may be identified to pinpoint where delays occurred amongst the delivery events, as well as identify major causes for delays. For example, for a particular delivery, the greatest discrepancy between predicted ETA and ATA may be identified for the parked at merchant event 224. If multiple instances of such discrepancy occur for multiple couriers, the cause may be identified as a lack of parking areas near such merchant. Once identified, this issue may be appropriately addressed to further optimize deliveries.

Figure 11:
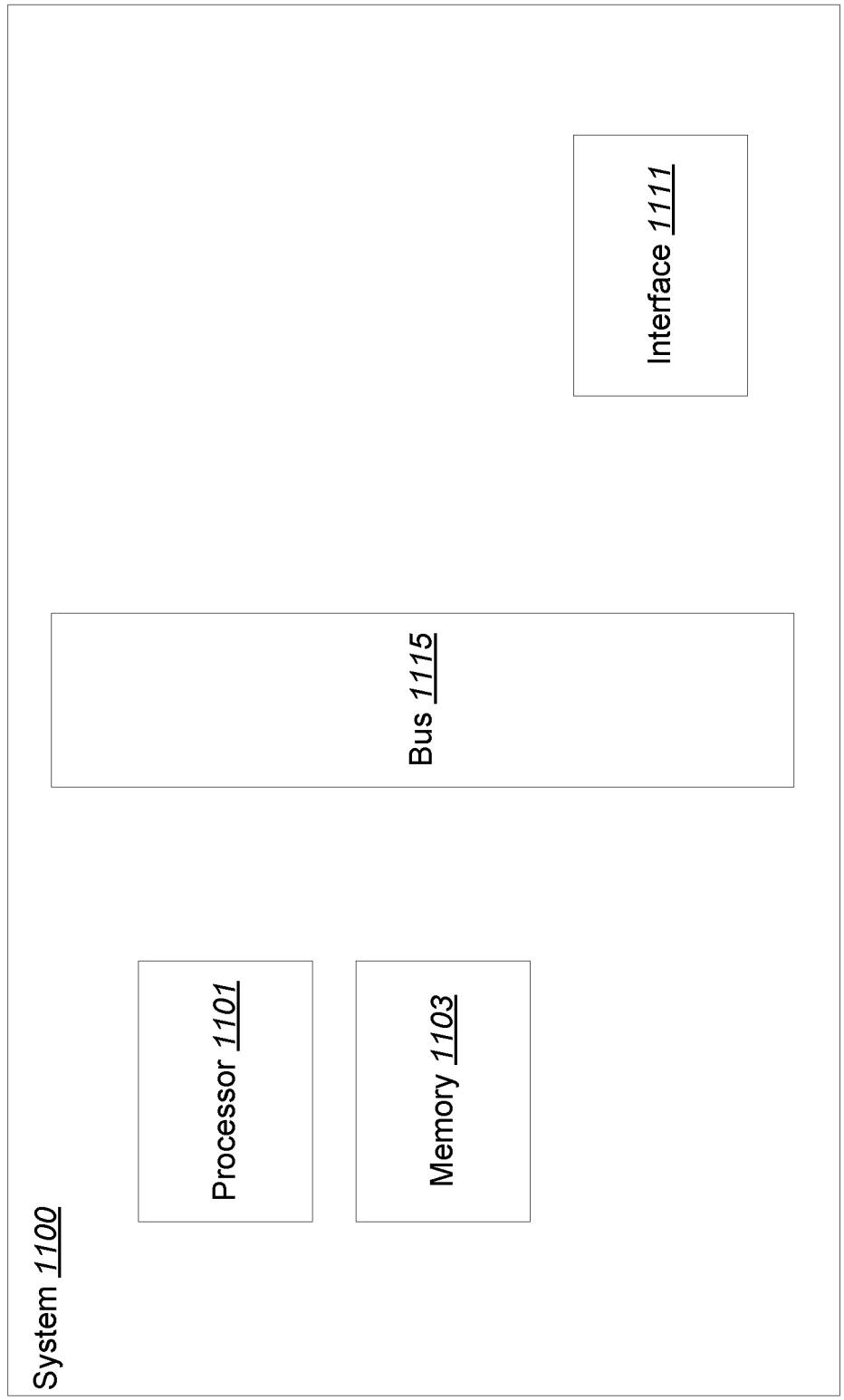
FIG. 11 illustrates a particular example of a computer system that can be used with various embodiments of the present disclosure.

Various computing devices can implement the methods described herein. For instance, a mobile device, computer system, etc. can be used to generate dynamic ETA predictive updates. With reference to FIG. 11, shown is a particular example of a computer system 1100 that can be used to implement particular examples of the present disclosure. According to particular example embodiments, a system 1100 suitable for implementing particular embodiments of the present disclosure includes a processor 1101, a memory 1103, an interface 1111, and a bus 1115 (e.g., a PCI bus). When acting under the control of appropriate software or firmware, the processor 1101 is responsible for processing inputs through various computational layers and algorithms in a neural network. In some embodiments, the processor is responsible for updating the parameters of each computational layer using algorithms, including but not limited to, a stochastic gradient descent algorithm and a back propagation algorithm. Various specially configured devices can also be used in place of a processor 1101 or in addition to processor 1101. The complete implementation can also be done in custom hardware.

The interface 1111 is typically configured to send and receive data packets or data segments over a network. Particular examples of interfaces the device supports include Ethernet interfaces, frame relay interfaces, cable interfaces, DSL interfaces, token ring interfaces, and the like. The interface 1111 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1100 uses memory 1103 to store data and program instructions for operations including training a neural network and generating ETA predictions, such as method 700. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method comprising:
    receiving, at a server system, an order message for a first order from a customer device corresponding to a first customer for real-time delivery of perishable goods from a first restaurant;
    receiving confirmations for a plurality of first events for the first order from at least one of a first merchant device corresponding to the first restaurant, a runner device corresponding to a runner, and a courier device corresponding to a courier, wherein the plurality of first events for the first order include: receipt of the first order, completion of the first order, receipt of the first order at an aggregation depot, and receipt of the first order by the first customer;

receiving a first timestamp corresponding to an initial event of the plurality of first events;

dynamically generating, via a neural network, estimated time of arrivals (ETAs) for one or more of the plurality of first events, including a first ETA corresponding to the completion of the first order, wherein the neural network is implemented by a processor and comprises a plurality of computational layers including weighted parameters, wherein in a training mode, the processor is configured to:
pass a dataset into the neural network, the dataset including a series of successive events with corresponding known time durations between events, and
train the neural network to dynamically output ETA predictive updates, wherein training the neural network includes: inputting different combinations of events and time durations, and comparing actual time of arrivals (ATAs) with generated ETA predictions to allow for the neural network to automatically and iteratively adjust weighted parameters in the neural network, wherein in an inference mode, the processor is configured to:
pass the initial event of the plurality of first events into the neural network, the initial event including the first timestamp,
automatically generate the first ETA based on the weighted parameters,
pass a subsequent event of the plurality of first events into the neural network, the subsequent event including an updated timestamp, and
automatically adjust the first ETA to form an updated ETA for the completion of the first order;

transmitting a first order notification to the runner device, wherein the first order notification includes: the first ETA and a storage location in an automated locker system of the aggregation depot, wherein the storage location is configured to store a batch of one or more orders grouped based on delivery proximity to the first customer, the batch of one or more orders including the first order;

transmitting a delivery notification to the courier device, wherein the delivery notification includes the storage location in the automated locker system and a customer location corresponding to the first customer; and authenticating the courier by the automated locker system to provide the courier access to the storage location.

2. The method of claim 1, further comprising receiving, at the server system, an order message for a second order for real-time delivery of perishable goods from a second restaurant, receiving confirmations for a plurality of second events for the second order from at least one of a second merchant device corresponding to the second restaurant, the runner device, and the courier device, wherein the plurality of second events for the second order include: receipt of the second order, completion of the second order, and receipt of the second order at the aggregation depot;

receiving a second timestamp corresponding to an initial event of the plurality of second events;

inputting the second timestamp into the neural network to dynamically generate ETAs for one or more of the plurality of second events, including a second ETA corresponding to the completion of the second order;

grouping the first order and the second order into a first group of orders based upon the first ETA and the second ETA; and transmitting a second order notification to the runner device, wherein the second order notification includes: the second ETA and the storage location in the automated locker system.

3. The method of claim 2, wherein the first order and the second order are grouped into the first group of orders based upon a proximity of the first restaurant to the second restaurant.

4. The method of claim 2, wherein the first order and the second order are grouped into the first group of orders are based upon a generated route assigned to the runner.

5. The method of claim 2, wherein the first order and the second order are grouped into the batch of one or more orders for pickup at the aggregation depot in the storage location in the automated locker system.

6. The method of claim 1, further comprising updating the first order notification to include the updated ETA.

7. The method of claim 1, wherein the weighted parameters include data on dishes in the first order.

8. The method of claim 1, wherein the weighted parameters include time, date, and weather.

9. The method of claim 1, wherein the weighted parameters include a sub-total of the order and a number of orders at the first restaurant.

10. A server system comprising:
one or more processors, memory, and one or more programs stored in the memory, the one or more programs comprising instructions for:
receiving, at the server system, an order message for a first order from a customer device corresponding to a first customer for real-time delivery of perishable goods from a first restaurant;
receiving confirmations for a plurality of first events for the first order from at least one of a first merchant device corresponding to the first restaurant, a runner device corresponding to a runner, and a courier device corresponding to a courier, wherein the plurality of first events for the first order include: receipt of the first order, completion of the first order, receipt of the first order at an aggregation depot, and receipt of the first order by the first customer;
receiving a first timestamp corresponding to an initial event of the plurality of first events;
dynamically generating, via a neural network, estimated time of arrivals (ETAs) for one or more of the plurality of first events, including a first ETA corresponding to the completion of the first order, wherein the neural network is implemented by the one or more processors and comprises a plurality of computational layers including weighted parameters,
wherein in a training mode, the one or more processors are configured to:
pass a dataset into the neural network, the dataset including a series of successive events with corresponding known time durations between events, and
train the neural network to dynamically output ETA predictive updates, wherein training the neural network includes: inputting different combinations of events and time durations, and comparing actual time of arrivals (ATAs) with generated ETA predictions to allow for the neural network to automatically and iteratively adjust weighted parameters in the neural network, wherein in an inference mode, the one or more processors are configured to:
pass the initial event of the plurality of first events into the neural network, the initial event including the first timestamp,
automatically generate the first ETA based on the weighted parameters,
pass a subsequent event of the plurality of first events into the neural network, the subsequent event including an updated timestamp, and
automatically adjust the first ETA to form an updated ETA for the completion of the first order;

transmitting a first order notification to the runner device, wherein the first order notification includes: the first ETA and a storage location in an automated locker system of the aggregation depot, wherein the storage location is configured to store a batch of one or more orders grouped based on delivery proximity to the first customer, the batch of one or more orders including the first order;

transmitting a delivery notification to the courier device, wherein the delivery notification includes the storage location in the automated locker system and a customer location corresponding to the first customer; and authenticating the courier by the automated locker system to provide the courier access to the storage location.

11. The server system of claim 10, wherein the one or more programs further comprise instructions for:
receiving, at the server system, an order message for a second order for real-time delivery of perishable goods from a second restaurant,
receiving confirmations for a plurality of second events for the second order from at least one of a second merchant device corresponding to the second restaurant, the runner device, and the courier device, wherein the plurality of second events for the second order include: receipt of the second order, completion of the second order, and receipt of the second order at the aggregation depot;
receiving a second timestamp corresponding to an initial event of the plurality of second events;
inputting the second timestamp into the neural network to dynamically generate ETAs for one or more of the plurality of second events, including a second ETA corresponding to the completion of the second order;
grouping the first order and the second order into a first group of orders based upon the first ETA and the second ETA; and
transmitting a second order notification to the runner device, wherein the second order notification includes: the second ETA and the storage location in the automated locker system.

12. The server system of claim 11, wherein the first order and the second order are grouped into the first group of orders based upon a proximity of the first restaurant to the second restaurant.

13. The server system of claim 11, wherein the first order and the second order are grouped into the first group of orders are based upon a generated route assigned to the runner.

14. The server system of claim 11, wherein the first order and the second order are grouped into the batch of one or more orders for pickup at the aggregation depot in the storage location in the automated locker system.

15. The server system of claim 10, further comprising updating the first order notification to include the updated ETA.

16. The server system of claim 10, wherein the weighted parameters include time, date, and weather.

17. The server system of claim 10, wherein the weighted parameters include a sub-total of the order and a number of orders at the first restaurant.

18. The server system of claim 10, wherein the weighted parameters include data on dishes in the first order.

19. A programmable device configured for aggregating on-demand deliveries, wherein the programmable device is configured for:
receiving, at a server system, an order message for a first order from a customer device corresponding to a first customer for real-time delivery of perishable goods from a first restaurant;
receiving confirmations for a plurality of first events for the first order from at least one of a first merchant device corresponding to the first restaurant, a runner device corresponding to a runner, and a courier device corresponding to a courier, wherein the plurality of first events for the first order include: receipt of the first order, completion of the first order, receipt of the first order at an aggregation depot, and receipt of the first order by the first customer;
receiving a first timestamp corresponding to an initial event of the plurality of first events;
dynamically generating, via a neural network, estimated time of arrivals (ETAs) for one or more of the plurality of first events, including a first ETA corresponding to the completion of the first order, wherein the neural network is implemented by a processor and comprises a plurality of computational layers including weighted parameters,
wherein in a training mode, the processor is configured to:
pass a dataset into the neural network, the dataset including a series of successive events with corresponding known time durations between events, and
train the neural network to dynamically output ETA predictive updates, wherein training the neural network includes: inputting different combinations of events and time durations, and comparing actual time of arrivals (ATAs) with generated ETA predictions to allow for the neural network to automatically and iteratively adjust weighted parameters in the neural network,
wherein in an inference mode, the processor is configured to:
pass the initial event of the plurality of first events into the neural network, the initial event including the first timestamp,
automatically generate the first ETA based on the weighted parameters,
pass a subsequent event of the plurality of first events into the neural network, the subsequent event including an updated timestamp, and automatically adjust the first ETA to form an updated ETA for the completion of the first order;

transmitting a first order notification to the runner device, wherein the first order notification includes: the first ETA and a storage location in an automated locker system of the aggregation depot, wherein the storage location is configured to store a batch of one or more orders grouped based on delivery proximity to the first customer, the batch of one or more orders including the first order;

transmitting a delivery notification to the courier device, wherein the delivery notification includes the storage location in the automated locker system and a customer location corresponding to the first customer; and authenticating the courier by the automated locker system to provide the courier access to the storage location.

20. The method of claim 1, wherein the initial event of the plurality of first events corresponds to the receipt of the first order.

* * * * *